(12) United States Patent
Yun et al.

(10) Patent No.: US 12,388,077 B2
(45) Date of Patent: Aug. 12, 2025

(54) POSITIVE ELECTRODE ACTIVE MATERIAL FOR RECHARGEABLE LITHIUM BATTERY, METHOD OF PREPARING THE SAME, AND RECHARGEABLE LITHIUM BATTERY

(71) Applicant: SAMSUNG SDI CO., LTD., Yongin-si (KR)

(72) Inventors: Pilsang Yun, Yongin-si (KR); Hyunbeom Kim, Yongin-si (KR); Hanseul Lee, Yongin-si (KR); Do-Yu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 145 days.

(21) Appl. No.: 18/150,097

(22) Filed: Jan. 4, 2023

(65) Prior Publication Data
US 2023/0352658 A1 Nov. 2, 2023

(30) Foreign Application Priority Data
Apr. 29, 2022 (KR) .......................... 10-2022-0053705

(51) Int. Cl.
*H01M 50/46* (2021.01)
*H01M 4/04* (2006.01)
(Continued)

(52) U.S. Cl.
CPC .......... *H01M 4/364* (2013.01); *H01M 4/0471* (2013.01); *H01M 4/525* (2013.01);
(Continued)

(58) Field of Classification Search
CPC .... H01M 4/364; H01M 4/0471; H01M 4/525; H01M 4/62; H01M 50/46; H01M 10/0525; H01M 2004/021; H01M 2004/028
See application file for complete search history.

(56) References Cited

U.S. PATENT DOCUMENTS

| 11,081,694 B2 | 8/2021 | Park et al. | |
| 2019/0173076 A1* | 6/2019 | Kim | .................... H01M 4/0471 |

(Continued)

FOREIGN PATENT DOCUMENTS

| EP | 3723172 A2 * | 10/2020 | ........... C01G 53/006 |
| KR | 2019065963 A * | 6/2019 | ........... C01G 53/006 |

(Continued)

OTHER PUBLICATIONS

Extended European Search Report dated Oct. 16, 2023 issued in corresponding European Application No. 22208325.5-1008, 8 pages.

(Continued)

*Primary Examiner* — Jane J Rhee
(74) *Attorney, Agent, or Firm* — Womble Bond Dickinson (US) LLP

(57) ABSTRACT

A method of preparing a positive electrode active material for a rechargeable lithium battery is provided to include: mixing a first nickel-based composite hydroxide in a form of a secondary particle in which a plurality of primary particles are aggregated and at least a portion of the primary particles have a radially arranged structure, a second lithium nickel-based composite oxide having a monolith structure, a lithium raw material, and a boron raw material; and performing heat-treatment.

20 Claims, 11 Drawing Sheets

(A)

(B)

(C)

(51) Int. Cl.
    *H01M 4/36*         (2006.01)
    *H01M 4/525*       (2010.01)
    *H01M 4/62*         (2006.01)
    *H01M 10/0525*     (2010.01)
    *H01M 4/02*         (2006.01)

(52) U.S. Cl.
    CPC ......... *H01M 4/62* (2013.01); *H01M 10/0525* (2013.01); *H01M 50/46* (2021.01); *H01M 2004/021* (2013.01); *H01M 2004/028* (2013.01)

(56) References Cited

U.S. PATENT DOCUMENTS

| | | |
|---|---|---|
| 2021/0043920 A1* | 2/2021 | Kim ..................... H01M 4/505 |
| 2021/0074998 A1 | 3/2021 | Yun et al. |
| 2021/0083287 A1 | 3/2021 | Ahn et al. |
| 2022/0069301 A1 | 3/2022 | Yun |
| 2022/0255072 A1 | 8/2022 | Yun et al. |

FOREIGN PATENT DOCUMENTS

| | | | |
|---|---|---|---|
| KR | 2339704 B1 * | 12/2021 | ........ H01M 10/0525 |
| KR | 10-2022-0070728 A | 5/2022 | |
| KR | 10-2022-0109912 A | 8/2022 | |

OTHER PUBLICATIONS

U.S. Final Office Action for U.S. Appl. No. 17/521,709, dated Mar. 20, 2025, 21 pages.

\* cited by examiner

POSITIVE ELECTRODE ACTIVE MATERIAL FOR RECHARGEABLE LITHIUM BATTERY, METHOD OF PREPARING THE SAME, AND RECHARGEABLE LITHIUM BATTERY

CROSS-REFERENCE TO RELATED APPLICATION

This application claims priority to and the benefit of Korean Patent Application No. 10-2022-0053705, filed in the Korean Intellectual Property Office on Apr. 29, 2022, the entire content of which is incorporated herein by reference.

BACKGROUND

1. Field

One or more aspects of embodiments of the present disclosure relate to a positive electrode active material for a rechargeable lithium battery, a method of preparing the same, and a rechargeable lithium battery including the same.

2. Description of the Related Art

A portable information device such as a cell phone, a laptop, a smart phone, and/or the like or an electric vehicle has utilized a rechargeable lithium battery having high energy density and easy portability as a driving power source. Recently, research has been actively conducted to utilize a rechargeable lithium battery with high energy density as a driving power source or power storage power source for hybrid or electric vehicles.

As a positive electrode active material for a rechargeable lithium battery, a lithium nickel-based oxide such as a lithium nickel manganese cobalt composite oxide, a lithium cobalt oxide, or the like is utilized. When such a positive electrode active material is utilized, a long-term cycle-life of the positive electrode active material decreases, a resistance thereof increases, and capacity characteristics do not reach a satisfactory and/or suitable level due to cracks generated in the positive electrode active material as charging and discharging are repeated, and thus improvement is desired.

SUMMARY

One or more aspects of embodiments of the present disclosure are directed toward a positive electrode active material for a rechargeable lithium battery having high pellet density and high initial discharge capacity, improved capacity per volume, and improved room-temperature and high-temperature cycle-life characteristics, a method for preparing the same, and a rechargeable lithium battery including the same.

Additional aspects will be set forth in part in the description which follows and, in part, will be apparent from the description, or may be learned by practice of the presented embodiments.

In one or more embodiments, provided is a method of preparing a positive electrode active material for a rechargeable lithium battery, the method including: mixing a first nickel-based composite hydroxide in a form of a secondary particle in which a plurality of primary particles are aggregated, a second lithium nickel-based composite oxide having a monolith structure, a lithium raw material, and a boron raw material; and performing heat-treatment.

In one or more embodiments, provided is a positive electrode active material for a rechargeable lithium battery. The positive electrode active material may include a first positive electrode active material that is a first lithium nickel-based composite oxide in a form of a secondary particle in which a plurality of primary particles are aggregated and at least a portion of the primary particles have a radially arranged structure, and a second positive electrode active material that is a second lithium nickel-based composite oxide having a monolith structure, wherein the first positive electrode active material and the second electrode positive electrode active material are coated with a boron-containing compound, and the first positive electrode active material may include a boron coating layer on a surface of the secondary particle and a boron doping layer inside the primary particles exposed on the surface of the secondary particle.

In one or more embodiments, provided is a rechargeable lithium battery that may include a positive electrode including the aforementioned positive electrode active material, a negative electrode, a separator between the positive electrode and the negative electrode, and an electrolyte.

The positive electrode active material and the rechargeable lithium battery including the same according to one or more embodiments have high pellet density and high initial discharge capacity, so that capacity per volume is improved, and room-temperature and high-temperature cycle-life characteristics are also improved.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
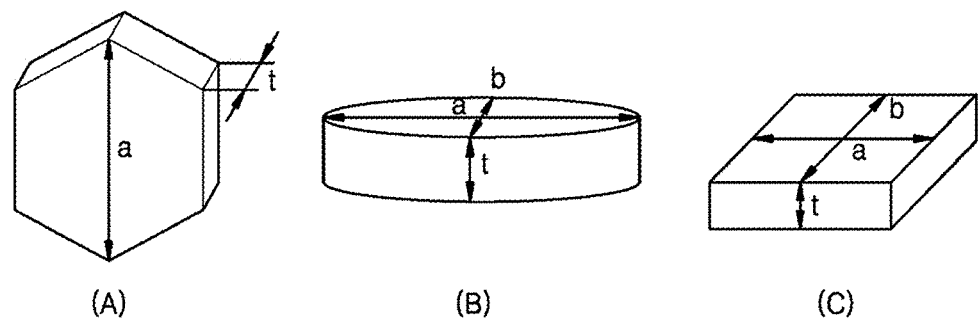
FIG. 1 is a schematic view showing the shape of a plate-shaped primary particle according to one or more embodiments of the present disclosure.

Hereinafter, specific embodiments will be described in more detail so that those of ordinary skill in the art can easily implement them. However, this disclosure may be embodied in many different forms and is not construed as limited to the example embodiments set forth herein.

The terminology utilized herein is utilized to describe embodiments only and is not intended to limit the present disclosure. The singular expression includes the plural expression unless the context clearly dictates otherwise.

As utilized herein, "combination thereof" may refer to a mixture, laminate, composite, copolymer, alloy, blend, reaction product, and/or the like of the constituents.

Herein, it should be understood that terms such as "comprise(s)," "include(s)," or "have/has" are intended to designate the presence of an embodied feature, number, step, element, or a combination thereof, but it does not preclude the possibility of the presence or addition of one or more other features, numbers, steps, elements, or a combination thereof.

In the drawings, the thickness of layers, films, panels, regions, etc., may be exaggerated for clarity and like reference numerals designate like elements throughout the present disclosure, and duplicative descriptions thereof may not be provided for conciseness. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In some embodiments, "layer" utilized herein may include not only a shape or layer formed on the whole surface when viewed from a plan view, but also a shape or layer formed on a partial surface.

In some embodiments, the average particle diameter may be measured by a method well suitable to those skilled in the art, for example, may be measured by a particle size analyzer, for example, HORIBA, LA-950 laser particle size analyzer, or may be measured by a transmission electron microscope (TEM) or a scanning electron microscope (SEM). In some embodiments, it is possible to obtain an average particle diameter value by measuring it utilizing a dynamic light scattering method, performing data analysis, counting the number of particles for each particle size range, and calculating from the data. In some embodiments, the average particle diameter may be measured by a microscope or a particle size analyzer and may refer to a diameter (D50) of particles having a cumulative volume of 50 volume % in a particle size distribution. D50 refers to the average diameter (or size) of particles whose cumulative volume corresponds to 50 vol % in the particle size distribution (e.g., cumulative distribution), and refers to the value of the particle size corresponding to 50% from the smallest particle when the total number of particles is 100% in the distribution curve accumulated in the order of the smallest particle size to the largest particle size. In the present specification, when particles are spherical, "diameter" indicates an average particle diameter, and when the particles are non-spherical, the "diameter" indicates a major axis length.

Herein, "or" is not to be construed as an exclusive meaning, for example, "A or B" is construed to include A, B, A+B, and/or the like. Further, as used herein, the term "and/or" includes any and all combinations of one or more of the associated listed items. Expressions such as "at least one of," "one of," and "selected from," when preceding a list of elements, modify the entire list of elements and do not modify the individual elements of the list.

As used herein, the singular forms "a," "an," and "the" are intended to include the plural forms as well, unless the context clearly indicates otherwise. Further, the use of "may" when describing embodiments of the present disclosure refers to "one or more embodiments of the present disclosure".

Positive Electrode Active Material

In one or more embodiments, a positive electrode active material for a rechargeable lithium battery including a first positive electrode active material and a second positive electrode active material is provided. The first positive electrode active material may include a first lithium nickel-based composite oxide in a form of a secondary particle in which a plurality of primary particles are aggregated and at least a portion of the primary particles have a radially arranged structure, and the first positive electrode active material is coated with a boron-containing compound. In one or more embodiments, the first positive electrode active material may include a boron coating layer on a surface (e.g., an outermost surface) of the secondary particle and a boron doping layer inside the primary particles exposed on the surface of the secondary particle. The second positive electrode active material may include a second lithium nickel-based composite oxide, has a monolith structure, and is coated with a boron-containing compound.

Such a positive electrode active material for a rechargeable lithium battery according to one or more embodiments has a high pellet density and a high initial discharge capacity, so that capacity per volume is very high, initial charge/discharge efficiency is high, and cycle-life characteristics at room temperature and high temperature are markedly improved.

A method of coating boron on a positive electrode active material in the related art is in general to mix a boron raw material with a lithium metal composite oxide in a wet or dry method and then, heat-treating the mixture. However, the boron may act as resistance on the surface of the positive electrode active material, and thus deteriorating capacity and a cycle-life of a lithium ion battery. For example, when two types (kinds) of positive electrode active materials are separately coated with boron and then mixed, pellet density and initial discharge capacity of all the positive electrode active materials are sharply deteriorated, thereby, significantly deteriorating capacity per volume of the lithium ion battery, and also deteriorating cycle-life characteristics of the lithium ion battery. In contrast, according to one or more embodiments of the present disclosure, while the second lithium nickel-based composite oxide having a monolith structure and a lithium source are added to the first nickel-based composite hydroxide (precursor) in which primary particles are radially arranged, a boron raw material is also added thereto, and then the mixture is heat-treated to obtain a positive electrode active material coated with a boron-containing compound. Herein, a first lithium nickel-based composite oxide in which the primary particles are radially arranged is obtained, and concurrently (e.g., simultaneously), an appropriate or suitable amount of boron is stably coated on surfaces of the first positive electrode active material and the second positive electrode active material, wherein the boron works no more as a resistance but secures structural stability of the positive electrode active material, thereby, suppressing problems due to a contact of the positive electrode active material with an electrolyte, and improving capacity characteristics and long-term cycle-life characteristics of a rechargeable lithium battery.

For example, a nickel-based positive electrode active material suffers structural collapse and cation mixing which cause gas generation or deterioration of cycle-life characteristics of a rechargeable lithium battery due to the formation of NiO and/or the like on its surface caused by repeated charges and discharges. In addition, because the positive electrode active material may be cracked due to the repeated charges and discharges, side reactions of the positive electrode active material with an electrolyte solution increase, as a result, battery capacity is reduced, and cycle-life characteristics deteriorates. However, according to one or more embodiments of the present disclosure, an appropriate or suitable amount of the boron-containing compound is concurrently (e.g., simultaneously) and stably coated on the surfaces of the first and second positive electrode active materials, a boron coating layer and a boron doping layer are concurrently (e.g., simultaneously) formed on the first positive electrode active material, thereby preventing or reducing release of oxygen atoms from the surface of the positive electrode active materials and suppressing or reducing the structural collapse of the positive electrode active material. As a result, the cracking phenomenon due to the repeated charges and discharges is suppressed or reduced. In some embodiments, even though the positive electrode active material is cracked, the side reactions with an electrolyte solution are still suppressed or reduced due to the boron-containing compound. Furthermore, the boron-containing compound on the surface of the positive electrode active material may facilitate lithium ions in the electrolyte solution to be easily accepted into the positive electrode active material, thereby improving discharge capacity.

First Positive Electrode Active Material

The first positive electrode active material may include a secondary particle including a first lithium nickel-based composite oxide, and a boron coating layer on a surface (e.g., an outermost surface) of the secondary particle. The boron coating layer may include a boron-containing compound. The boron-containing compound may include, for example, boron oxide, lithium borate, or a combination thereof, and may include, for example, $B_2O_2$, $B_2O_3$, $B_4O_3$, $B_4O_3$, $LiBO_2$, $Li_3B_7O_{12}$, $Li_6B_4O_9$, $Li_3B_{11}O_{18}$, $Li_2B_4O_7$, $Li_3BO_3$, or one or more combinations thereof.

The boron-containing compound may exist or present in the form of a substantially continuous film or may be coated in the form of an island, on the surface of the first positive electrode active material and the surface of the second positive electrode active material.

In one or more embodiments, an amount of boron (e.g., mole amount) based on the total amount (e.g., mole amount) of elements other than lithium and oxygen in the positive electrode active material may be about 0.01 mol % to about 0.5 mol %, for example, about 0.01 mol % to about 0.4 mol %, about 0.01 mol % to about 0.3 mol %, or about 0.1 mol % to about 0.3 mol %. In some embodiments, the amount of boron (e.g., weight amount) based on the total amount (e.g., weight amount) of elements other than lithium and oxygen in the entire positive electrode active material may be about 0.01 wt % to about 0.5 wt %, for example, about 0.01 wt % to about 0.3 wt %, about 0.01 wt % to about 0.2 wt %, or about 0.01 wt % to about 0.1 wt %. The amount of boron (e.g., mole amount or weight amount) may be measured by, for example, inductively coupled plasma (ICP) emission spectroscopy. When boron is coated with such an amount disclosed above, boron does not act as a resistance, the capacity of a rechargeable lithium battery does not decrease, the diffusion of lithium ions into the positive electrode active material becomes easier, and the initial charge/discharge efficiency is improved. Problems caused by repeated charge and discharge are suppressed or reduced, and long-term cycle-life characteristics of the rechargeable lithium battery is improved.

According to a preparing method of one or more embodiments of the present disclosure, the first positive electrode active material may include not only a boron coating layer on the surface of the secondary particle, but also a boron doping layer inside the primary particles exposed to the surface of the secondary particle. The boron doping layer may be disposed or located in an inner portion of the secondary particle and may be disposed or located within a depth range of about 10 nm from an outer surface of the primary particle exposed to the surface of the secondary particle. When the outer surface of the primary particle exposed to the surface of the secondary particles is about 0 nm from the surface of the secondary particle (e.g., the outer surface of the primary particle forms at least a portion of the surface of the secondary particle), the boron doping layer may be present within a depth range of about 0 nm to about 10 nm from the surface of the secondary particle. In some embodiments, the boron doping layer also may be said to be located within a depth range of about 10 nm from the surface of the secondary particle. Such a boron doping layer may further improve a structural stability of the positive electrode active material, and thus may improve cycle-life characteristics of the rechargeable lithium battery.

The boron doping layer may be disposed or located, for example, within a depth range of about 9 nm, within a depth range of about 8 nm, within a depth range of about 7 nm, within a depth range of about 6 nm, within a depth range of about 5 nm, within a depth range of about 4 nm, within a depth range of about 3 nm, or within a depth range of about 2.5 nm from the outer surface of the primary particle exposed to the surface of the secondary particle. The boron doping layer is distinguished from the boron coating layer and from a grain boundary boron coating portion described later and contributes to structural stability of the positive electrode active material.

In some embodiments, according to the preparing method of the present disclosure, in the first positive electrode active material, the boron-containing compound may exist not only on the surface of the secondary particle but also on a surface of the primary particle in the inner portion of the secondary particles. For example, the boron-containing compound may be coated along an interface between the primary particles in the inner portion of the secondary particle. Herein, the inner portion of the secondary particle may refer to the entire interior except for the surface of the secondary particle, for example, may refer to the entire interior from a depth of approximately 2 μm from the surface of the secondary particle in one or more embodiments. In some embodiments, the inner portion of the secondary particle may also be expressed as an inaccessible portion for distilled water when the secondary particles of the positive electrode active material are washed with distilled water. As such, in the first positive electrode active material, when the boron-containing compound is coated on the surface of secondary particle and surfaces of internal grain boundaries (e.g., interfaces between primary particles), boron may not act as resistance but effectively suppress or reduce structural collapse or cracking of the positive electrode active material caused by repeated charge and discharge.

Herein, an amount of boron (e.g., weight amount) on the surface of the secondary particle may be higher, for example, greater than or equal to about 4 times higher than an amount of boron at the internal grain boundaries. For example, a boron weight in the boron coating layer on the surface of secondary particle and a boron weight in grain boundary boron coating portions may have a weight ratio of about 70:30 to about 98:2, for example, about 75:25 to about 97:3, or about 80:20 to about 95:5. Herein, the boron may not act as resistance in the positive electrode active material but play a role of improving performance and thus improve capacity characteristics and cycle-life characteristics of a rechargeable lithium battery concurrently.

In one or more embodiments, the amount of boron (e.g., weight amount) in the boron coating layer on the surface of secondary particle may be about 0.02 wt % to about 0.5 wt %, about 0.03 wt % to about 0.4 wt %, about 0.04 wt % to about 0.3 wt %, about 0.05 wt % to about 0.2 wt %, and/or the like based on a total weight amount of the first positive electrode active material. The amount of boron (e.g., weight amount) in the grain boundary boron coating portions may be for example, about 0.001 wt % to about 0.05 wt %, about 0.001 wt % to about 0.04 wt %, about 0.002 wt % to about 0.03 wt %, or about 0.003 wt % to about 0.02 wt % based on the total weight amount of the first positive electrode active material, but is not limited thereto. When the amount of boron (e.g., weight amount) of the boron coating layer on the surface of secondary particle is greater than or equal to about 4 times higher than the amount of boron in the grain boundary boron coating portions, capacity characteristics and cycle-life characteristics of a rechargeable lithium battery may be all improved. Herein, the amount of boron (e.g., weight amount) of the boron coating layer may be measured through inductively coupled plasma (ICP) emission spectroscopic analysis of the positive electrode active material, and the amount of boron (e.g., weight amount) in the grain boundary boron coating portions may be measured through ICP emission spectroscopic analysis, which may refer to a boron amount (e.g., weight amount) difference before and after washing the positive electrode active material.

In one or more embodiments, the first positive electrode active material may include a secondary particle in which at least two or more primary particles are aggregated, and at least a portion of the primary particles have a radially arranged structure.

In one or more embodiments, at least a portion of the primary particles may have a plate shape. FIG. 1 is a schematic view illustrating a plate shape of primary particles of a first positive electrode active material according to one or more embodiments. Referring to FIG. 1, the primary particles according to one or more embodiments may have one or more suitable detailed shapes while having a basic plate structure, for example, (A) a polygonal nanoplate shape such as a hexagon, (B) a nanodisk shape, and (C) a rectangular parallelepiped shape. In FIG. 1, "a" may refer to a length of a long axis of the primary particle, "b" may refer to a length of a short axis of the primary particle, and "t" may refer to a thickness of the primary particle. Herein, the length (a) of the long axis may refer to a maximum length with respect to the widest surface of the primary particle. The thickness (t) may be a maximum length of a surface that is approximately perpendicular to the widest surface of the primary particle. A direction containing the length (a) of the long axis and the length (b) of the short axis may refer to as a plane direction, and a direction in which the thickness (t) is defined may refer to as a thickness direction.

The thickness (t) of the primary particle may be smaller than the length (a) of the long axis and the length (b) of the short axis of the primary particle, which are lengths in the plane direction. The length (a) of the long axis of the primary particle among the lengths in the plane direction may be longer than or the same as the length (b) of the short axis of the primary particle.

Figure 2:
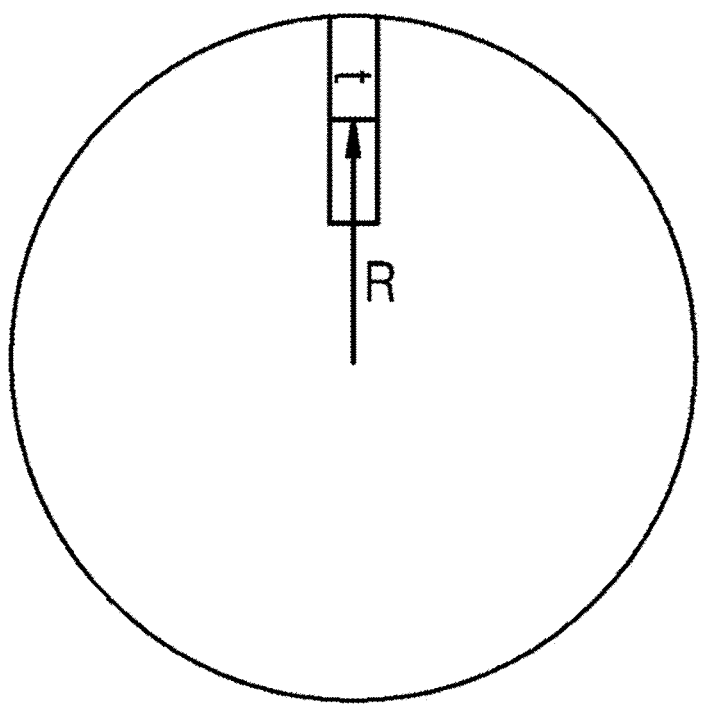
FIG. 2 is a view for explaining the definition of a radial in a secondary particle according to one or more embodiments of the present disclosure.

In the positive electrode active material, at least a portion of the primary particles may have a radially arranged structure, and for example, long axes of the primary particles may be arranged in a radial direction. FIG. 2 is a view for explaining the definition of a radial in a secondary particle according to one or more embodiments. In one or more embodiments of the present disclosure, the radially arranged structure may refer to that, as shown in FIG. 2, the thickness (t) direction of a primary particle is perpendicular to or within an angle of about ±5° of perpendicular to a direction (R) of the secondary particle from the center of the secondary particle to the surface of the secondary particle substantially parallel to the plane direction of the primary particle.

The average length of the primary particles constituting the secondary particle may be about 0.01 μm to about 5 μm, for example, about 0.01 μm to about 2 μm, about 0.01 μm to about 1 μm, about 0.02 μm to about 1 μm, about 0.05 μm to about 0.5 μm, or about 150 nm to about 500 nm. Herein, the average length of the primary particles may refer to the average length of the long axis length (a) in the plane direction of the primary particles when the primary particles are plate-shaped, and when the primary particle is spherical, the average length of the primary particles may refer to the average particle diameter of the primary particles.

When the primary particles are plate-shaped, an average thickness of the primary particles may be for example greater than or equal to about 50 nm, greater than or equal to about 100 nm, greater than or equal to about 200 nm, greater than or equal to about 300 nm, greater than or equal to about 400 nm, greater than or equal to about 500 nm, greater than or equal to about 600 nm, greater than or equal to about 700 nm, greater than or equal to about 800 nm, or greater than or equal to about 900 nm, and, for example, less than or equal to about 5 μm, less than or equal to about 4 μm, less than or equal to about 3 μm, less than or equal to about 2 μm, less than or equal to about 1 μm, less than or equal to about 900 nm, less than or equal to about 800 nm, less than or equal to about 700 nm, less than or equal to about 600 nm, or less than or equal to about 500 nm, for example about 100 nm to about 200 nm. In some embodiments, for a primary particle, a ratio of the average thickness to the average length may be about 1:1 to about 1:10, for example, about 1:1 to about 1:8, about 1:1 to about 1:6, or about 1:2 to about 1:5.

Herein, the length and thickness of the primary particles may be measured with an optical and/or electron microscope such as a scanning electron microscope, the average length of the primary particles may refer to an arithmetic mean value of about 30 pieces of length data of the measured primary particles, and the average thickness of the primary particles may refer to an arithmetic mean value of about 30 pieces of thickness data of the measured primary particles.

As described above, when the average length, the average thickness, and the ratio between the average thickness and the average length of the primary particles satisfy the above ranges and the primary particles are radially arranged, it is possible to have relatively many lithium diffusion pathways between grain boundaries on the surface side of the primary particles, and a large number of crystal planes capable of lithium transfer are exposed to the outside, so that lithium diffusion is improved or promoted, and high initial efficiency and capacity may be achieved and secured. In some embodiments, when the primary particles are arranged radially, the pores exposed on the surface of the secondary particle are directed toward the center of the secondary particle, thereby promoting diffusion of lithium. Due to the radially arranged primary particles, substantially uniform contraction and expansion are possible when lithium is deintercalated and/or intercalated, and when lithium is deintercalated, pores existing in the (001) direction of the primary particle, which is the direction in which the particles expand, may act as a buffer. In addition, due to the size and arrangement of the primary particles, the probability of cracks occurring during contraction and expansion of the active material may be lowered. The internal pores further alleviate the volume change to reduce the cracks generated between the primary particles during charging and discharging. As a result, cycle-life characteristics of the rechargeable lithium battery is improved, and resistance increase phenomenon of the rechargeable lithium battery is reduced.

The first positive electrode active material may have irregular pores (e.g., an irregular porous structure) in at least one selected from the inner and outer portions of the secondary particle. The irregular porous structure may refer to that a structure has primary particles and pores, but the pore size, shape, and position are not regular. For example, the secondary particle may include an inner portion containing an irregular porous structure and an outer portion containing a radially arranged structure as a region around (e.g., surrounding) the inner portion. For example, the primary particles disposed in the inner portion of the secondary particle may be arranged without regularity, unlike primary particles disposed in the outer portion of the second particle. The radially arranged structure utilized herein may refer to that at least some of the primary particles are arranged radially.

Herein, the term "outer portion" may refer to a region from the outermost surface of the secondary particle to about 30 length % to about 50 length % out of a total distance from the center of the secondary particle to the surface (e.g., the outermost surface) of the secondary particle, for example, a region to about 40 length % from the outermost surface, or a region from the outermost surface of secondary particle to a depth of about 3 μm. In addition, the term "inner portion" may refer to the rest of region other than the region from the outermost surface of the secondary particle to about 50 length % to about 70 length % out of the total distance from the center of the secondary particle to the surface of the secondary particle, for example, the rest of region other than the region from the outermost surface to about 60 length % out of the total distance from the center of the secondary particle to the surface of the secondary particle, or the rest of region other than the region from the outermost surface of secondary particles to a depth of about 3 μm.

In one or more embodiments, the secondary particle of the first positive electrode active material may include an outer portion having a radially arranged structure and an inner portion having an irregular porous structure, wherein the inner portion of the secondary particle may include pores with a larger size than pores in the outer portion of the secondary particle. For example, in the first positive electrode active material, the pores in the inner portion (e.g., inner pores) may have a size of about 150 nm to about 1 μm, and the pores in the outer portion (e.g., outer pores) may have a size of less than about 150 nm. In this way, when the inner pores have a larger size than the outer pores, compared with secondary particles having the same inner and outer pore sizes, there may be effects of shortening the lithium diffusion distance in the inner portion of the electrode active material, easily inserting lithium from the outside, and alleviating the volume change during the charge and discharge. Herein, the pores may have a size which is a diameter when spherical or circular, or a length of a long axis when oval and/or the like, wherein the size may be measured with a microscope such as a scanning electron microscope.

The secondary particle of the first positive electrode active material may have open pores on the surface of the secondary particle. These open pores may have a size of less than about 150 nm, for example, about 10 nm to about 148 nm. The open pores are pores in which some of walls of the pores are not closed, are formed by the space between the radially arranged plate-shaped primary particles, and are pores deeply connected from the surface of the secondary particle toward the center of the secondary particle (e.g., connected in a central direction from the surface of the secondary particle). These open pores may be connected to the outside and may become a passageway through which materials may enter and exit. The open pores may be in a form oriented toward the center of the second particle from the surface of the secondary particle, and may be formed to a depth of, on average, less than or equal to about 150 nm, for example, about 0.001 nm to about 100 nm, for example, about 1 nm to about 50 nm from the surface of the secondary particle. The size and depth of the open pores may be measured by the BJH (Barrett, Joyner, and Halenda) method, which is a method derived through the adsorption or desorption content (e.g., amount) of nitrogen.

In one or more embodiments, the closed pores may exist in the inner portion of the secondary particle, and closed pores and/or open pores may exist in the outer portion of the secondary particle. The closed pores may exclude or mostly exclude an electrolyte, while the open pores may include an electrolyte therein. The closed pores may be referred to as independent pores that are not connected to other pores because all of walls of the closed pores are formed in a closed structure.

Figure 3:
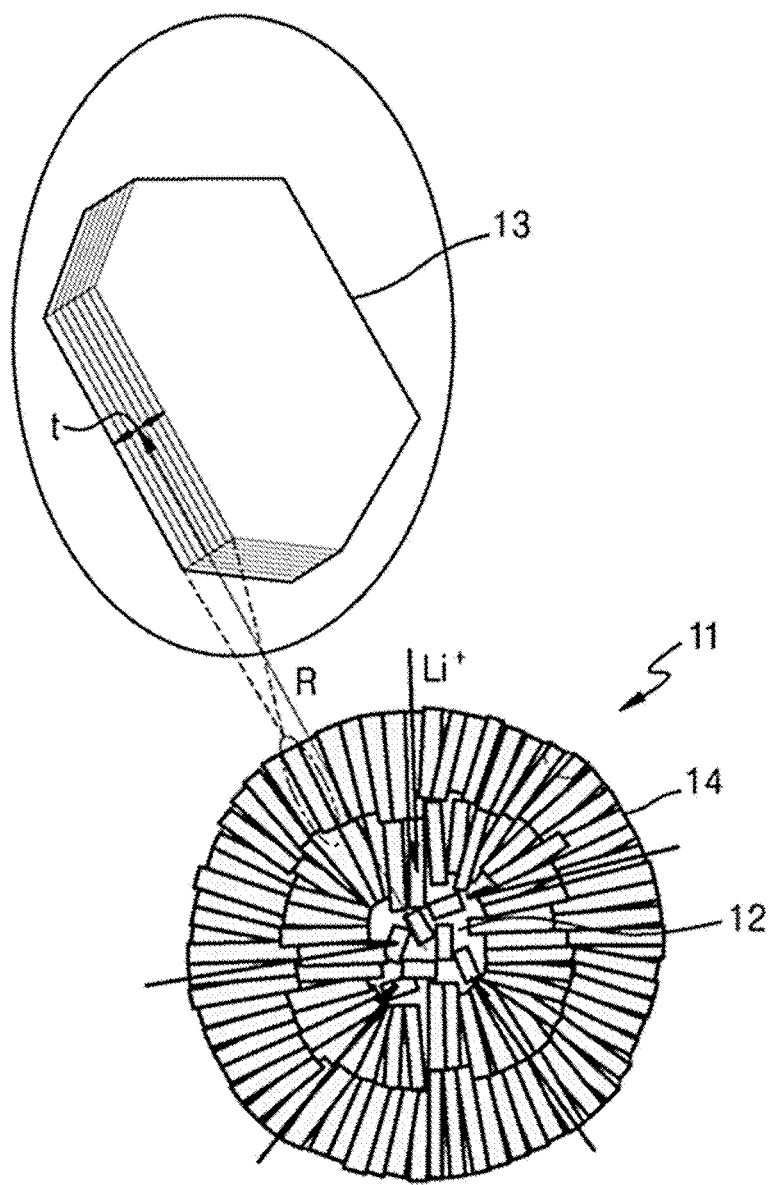
FIG. 3 is a schematic view showing a cross-sectional structure of a secondary particle according to one or more embodiments of the present disclosure.

FIG. 3 is a schematic view illustrating a cross-sectional structure of a secondary particle of a first positive electrode active material according to one or more embodiments. Referring to FIG. 3, the secondary particle 11 of the first positive electrode active material according to one or more embodiments may include an outer portion 14 having a structure in which the primary particles 13 having a plate shape are arranged in a radial direction, and an inner portion 12 in which the primary articles 13 are irregularly arranged. The inner portion 12 may include more empty spaces between the primary particles than the outer portion 14. In some embodiments, the pore size and porosity in the inner portion of the secondary particle are large and irregular compared with the pore size and porosity in the outer portion of the secondary particle. In FIG. 3, arrows indicate the movement directions of lithium ions.

In one or more embodiments, in the secondary particle, the inner portion of the secondary particle may include a porous structure, so that the diffusion distance of lithium ions to the inner portion is reduced, and in the outer portion of the secondary particle, primary particles are radially arranged toward the surface, so that lithium ions are easily intercalated into the surface of the secondary particle. In some embodiments, because the size of the primary particles is small, it is easy to secure a lithium transfer path between crystal grains. In some embodiments, because the size of the primary particles is small and the pores between the primary particles alleviate the volume change occurring during charging and discharging, the stress caused by the volume change during charging and discharging may be minimized or reduced. Such a positive electrode active material may reduce resistance of a rechargeable lithium battery and improve capacity characteristics and cycle-life characteristics of the rechargeable lithium battery.

In one or more embodiments, in the secondary particle, the plurality of primary particles may have a radially arranged structure by being arranged toward a single (1) center to make surface contact along the thickness direction of the primary particles. In some embodiments, the secondary particle may have a multi-center radially arranged structure having a plurality of centers. As such, when the secondary particles have a single-center or multi-center radially arranged structure, lithium may be easily deintercalated and/or intercalated to the center of the secondary particle.

In one or more embodiments, the secondary particle may include radial primary particles and non-radial primary particles. The amount (e.g., weight amount) of the non-radial primary particles may be less than or equal to about 40 wt %, for example about 0.01 wt % to about 30 wt %, or about 0.1 wt % to about 20 wt %, based on 100 parts by weight of the total weight of the radial primary particles and the non-radial primary particles. When non-radial primary particles are included in the above-described amount (e.g., weight amount) range in addition to the radial primary particles in the secondary particle, the cycle-life characteristics of a rechargeable lithium batter is improved by facilitating the diffusion of lithium.

In one or more embodiments, the average particle diameter of the secondary particle of the first positive electrode active material may be about 5 μm to about 25 μm, for example, about 8 μm to about 20 μm, or about 10 μm to about 18 μm. In these embodiments, the capacity of the positive electrode active material for the rechargeable lithium battery may be increased, and the pellet density and energy density may be further increased. The average particle diameter of the secondary particle of the first positive electrode active material may be measured by a particle size analyzer using a laser diffraction method, and may mean a diameter (D50) of particles having a cumulative volume of 50 volume % in a particle size distribution.

Second Positive Electrode Active Material

The second positive electrode active material has a monolith structure, which may refer to that one single particle is present alone without a grain boundary thereinside and particles are not aggregated one another but present as an independent phase in terms of morphology, and it may refer to a single particle, a one body particle, a single grain, a monolith structure, or a non-aggregated particle, and may be, for example, a single crystal. It may be expressed that the second positive electrode active material comprises a second lithium nickel-based composite oxide in a form of a single particle, or the second positive electrode active material comprises a single particle comprising a second lithium nickel-based composite oxide, or the second positive electrode active material is in a form of a single particle. The positive electrode active material according one or more the embodiments may exhibit improved cycle-life characteristics while implementing high capacity and high energy density by including the second positive electrode active material.

The second positive electrode active material has no particular limit to a shape but may have one or more suitable shapes such as a polyhedron, an oval, a plate, a rod, an irregular shape, and/or the like.

In one or more embodiments, an average particle diameter of the single particle (the monolith structure) of the second positive electrode active material may be about 0.05 μm to about 8 μm. For example, the average particle diameter may be about 0.1 μm to about 7 μm, about 0.1 μm to about 6 μm, about 0.1 μm to about 5 μm, or about 1 μm to about 4 μm. In these embodiments, the pellet density and energy density of the positive electrode active material for the rechargeable lithium battery may be further increased. The average particle diameter of the second positive electrode active material may be measured by a particle size analyzer using a laser diffraction method, and may mean a diameter (D50) of particles having a cumulative volume of 50 volume % in a particle size distribution.

The second positive electrode active material is coated with a boron-containing compound, and the boron-containing compound may include, for example, boron oxide, lithium borate, or a combination thereof, for example, $B_2O_2$, $B_2O_3$, $B_4O_3$, $B_4O_5$, $LiBO_2$, $Li_3B_7O_{12}$, $Li_6B_4O_9$, $Li_3B_{11}O_{18}$, $Li_2B_4O_7$, $Li_3BO_3$ or a combination thereof.

The boron-containing compound may be coated on the entire surface of the second positive electrode active material in a form of a substantially continuous film, or in a form of an island.

In one or more embodiments, the amount of boron (e.g., mole amount) based on the total amount (e.g., mole amount) of elements excluding lithium and oxygen in the total positive electrode active material including the first positive electrode active material and the second positive electrode active material may be about 0.01 mol % to about 0.5 mol %, for example about 0.01 mol % to about 0.4 mol %, about 0.01 mol % to about 0.3 mol %, or about 0.1 mol % to about 0.3 mol %. In one or more embodiments, the amount of boron (e.g., weight amount) based on the total amount (e.g., weight amount) of elements excluding lithium and oxygen in the total positive electrode active material including the first positive electrode active material and the second positive electrode active material may be about 0.01 wt % to about 0.5 wt %, about 0.01 wt % to about 0.3 wt %, about 0.01 wt % to about 0.2 wt %, or about 0.01 wt % to about 0.1 wt %.

The monolith structure makes it difficult for lithium to diffuse into the particles, but the boron-containing compound coated on the surface of the particles may make the lithium easily diffused thereinto and thus effectively prevent or reduce the escape of oxygen atoms on the surface of the positive electrode active material. When the boron is included within the amount ranges disclosed above, this effect may be maximized or increased. When the amount of boron is excessive, high-temperature cycle-life characteristics of the rechargeable lithium battery may be deteriorated.

The second positive electrode active material may be included in an amount of about 10 wt % to about 50 wt % based on the total weight of the positive electrode active material for the rechargeable lithium battery. For example, the second positive electrode active material may be included in an amount of greater than or equal to about 10 wt %, greater than or equal to about 15 wt %, greater than or equal to about 20 wt %, or greater than or equal to about 25 wt %, and for example, less than or equal to about 50 wt %, less than or equal to about 45 wt %, less than or equal to about 40 wt %, or less than or equal to about 35 wt %.

For example, in one or more embodiments, the positive electrode active material for the rechargeable lithium battery may include about 50 wt % to about 90 wt % of the first positive electrode active material, and about 10 wt % to about 50 wt % of the second positive electrode active material, and for example about 60 wt % to about 90 wt % of the first positive electrode active material and about 10 wt % to about 40 wt % of the second positive electrode active material. The sum of the weight percentage of the first positive electrode active material and the weight percentage of the second positive electrode active material is 100 wt %.

The first lithium nickel-based composite oxide and the second lithium nickel-based composite oxide may be the same as or different from each other in term of chemical composition.

An amount of nickel (e.g., mole amount) in the lithium nickel-based composite oxide (e.g., in the first lithium nickel-based composite oxide, in the second lithium nickel-based composite oxide) may be greater than or equal to about 30 mol %, for example greater than or equal to about 40 mol %, greater than or equal to about 50 mol %, greater than or equal to about 60 mol %, greater than or equal to about 70 mol %, greater than or equal to about 80 mol %, or greater than or equal to about 90 mol %, and less than or equal to about 99.9 mol %, or less than or equal to about 99 mol % based on the total amount of elements other than lithium and oxygen in the lithium nickel-based composite oxide.

For example, in one or more embodiments, the amount of nickel (e.g., mole amount) in the lithium nickel-based composite oxide may be higher than an amount (e.g., mole amount) of each of other metals such as cobalt, manganese, and aluminum in the lithium nickel-based composite oxide. When the amount of nickel (e.g., mole amount) satisfies the above ranges, the positive electrode active material may exhibit excellent or suitable battery performance while realizing a high capacity.

In one or more embodiments, the first lithium nickel-based composite oxide and the second lithium nickel-based composite oxide may each independently be represented by Chemical Formula 1.

$$Li_{a1}Ni_{x1}M^1_{y1}M^2_{1-x1-y1}O_{2-z}X_z \quad \text{Chemical Formula 1}$$

In Chemical Formula 1, $0.9 \leq a1 \leq 1.8$, $0.3 \leq x1 \leq 1$, $0 \leq y1 \leq 0.7$, and $0 \leq z \leq 0.1$, $M^1$ and $M^2$ may each independently be at least one element selected from aluminum (Al), boron (B), barium (Ba), calcium (Ca), cerium (Ce), cobalt (Co), chromium (Cr), iron (Fe), magnesium (Mg), manganese (Mn), (molybdenum) Mo, niobium (Nb), silicon (Si), strontium (Sr), titanium (Ti), vanadium (V), tungsten (W), and zirconium (Zr), and X is at least one element selected from fluorine (F), phosphorous (P), and sulfur (S).

In some embodiments, in Chemical Formula 1, $0.4 \leq x1 \leq 1$ and $0 \leq y1 \leq 0.6$, $0.5 \leq x1 \leq 1$ and $0 \leq y1 \leq 0.5$, $0.6 \leq x1 \leq 1$ and $0 \leq y1 \leq 0.4$, $0.7 \leq x1 \leq 1$ and $0 \leq y1 \leq 0.3$, $0.8 \leq x1 \leq 1$ and $0 \leq y1 \leq 0.2$, or $0.9 \leq x1 \leq 1$ and $0 \leq y1 \leq 0.1$.

In one or more embodiments, the first lithium nickel-based composite oxide and the second lithium nickel-based composite oxide may each independently be represented by Chemical Formula 2.

$$Li_{a2}Ni_{x2}Co_{y2}M^3_{1-x2-y2}O_{2-z}X_z \quad \text{Chemical Formula 2}$$

In Chemical Formula 2, $0.9 \leq a2 \leq 1.8$, $0.3 \leq x2 < 1$, $0 < y2 \leq 0.7$, and $0 \leq z \leq 0.1$, $M^3$ is at least one element selected from Al, B, Ba, Ca, Ce, Cr, Fe, Mg, Mn, Mo, Nb, Si, Sr, Ti, V, W, and Zr, and X is at least one element selected from F, P, and S.

In some embodiment, in Chemical Formula 2, $0.3 \leq x2 \leq 0.99$ and $0.01 \leq y2 \leq 0.7$, $0.4 \leq x2 \leq 0.99$ and $0.01 \leq y2 \leq 0.6$, $0.5 \leq x2 \leq 0.99$ and $0.01 \leq y2 \leq 0.5$, $0.6 \leq x2 \leq 0.99$ and $0.01 \leq y2 \leq 0.4$, $0.7 \leq x2 \leq 0.99$ and $0.01 \leq y2 \leq 0.3$, $0.8 \leq x2 \leq 0.99$ and $0.01 \leq y2 \leq 0.2$, or $0.9 \leq x2 \leq 0.99$ and $0.01 \leq y2 \leq 0.1$.

In one or more embodiments, the first lithium nickel-based composite oxide and the second lithium nickel-based composite oxide may each independently be represented by Chemical Formula 3.

$$Li_{a3}Ni_{x3}Co_{y3}M^4_{z3}M^5_{1-x3-y3-z3}O_{2-z}X_z \quad \text{Chemical Formula 3}$$

In Chemical Formula 3, $0.9 \leq a3 \leq 1.8$, $0.3 \leq x3 \leq 0.98$, $0.01 \leq y3 \leq 0.69$, $0.01 \leq z3 \leq 0.69$, and $0 \leq z \leq 0.1$, $M^4$ is at least one element selected from Al and Mn, $M^5$ is at least one element selected from B, Ba, Ca, Ce, Cr, Fe, Mg, Mo, Nb, Si, Sr, Ti, V, W, and Zr, and X is at least one element selected from F, P, and S.

In some embodiments, in Chemical Formula 3, $0.4 \leq x3 \leq 0.98$, $0.01 \leq y3 \leq 0.59$, and $0.01 \leq z3 \leq 0.59$, or $0.5 \leq x3 \leq 0.98$, $0.01 \leq y3 \leq 0.49$, and $0.01 \leq z3 \leq 0.49$, or $0.6 \leq x3 \leq 0.98$, $0.01 \leq y3 \leq 0.39$, and $0.01 \leq z3 \leq 0.39$, or $0.7 \leq x3 \leq 0.98$, $0.01 \leq y3 \leq 0.29$, and $0.01 \leq z3 \leq 0.29$, or $0.8 \leq x3 \leq 0.98$, $0.01 \leq y3 \leq 0.19$, and $0.01 \leq z3 \leq 0.19$, or $0.9 \leq x3 \leq 0.98$, $0.01 \leq y3 \leq 0.09$, and $0.01 \leq z3 \leq 0.09$.

Generally, as the amount of nickel (e.g., mole amount) in the positive electrode active material is increased, because of cation mixing, $Ni^{2+}$ ions taking lithium sites also increases, the capacity of a rechargeable lithium battery rather decreases, or because diffusion of lithium ions is hindered by impurities such as NiO and/or the like, the cycle-life of a rechargeable lithium battery may be deteriorated. In addition, the positive electrode active material may have a side reaction with an electrolyte due to the structural collapse and cracks caused by charging and discharging, which may decrease the cycle-life of a rechargeable lithium battery and bring about a safety problem. In order to solve these problems, when boron is coated only on the surface of an active material in a method utilized in the art, the boron acts as resistance and rather decreases the capacity of a rechargeable lithium battery and deteriorates the cycle-life of the rechargeable lithium battery. In contrast, in the positive electrode active material according to one or more embodiments of the present disclosure, even if a high nickel-based material is utilized, when an appropriate or suitable amount of boron is coated on the first positive electrode active material and the second positive electrode active material concurrently, a high capacity of a rechargeable lithium battery may be realized due to the high concentration of nickel, and cycle-life characteristics of the rechargeable lithium battery may be improved without deteriorating initial discharge capacity.

The positive electrode active material for a rechargeable lithium battery according to one or more embodiments of the present disclosure may have a high pellet density and implement high specific capacity and energy density. The pellet density of the positive electrode active material for the rechargeable lithium battery may be, for example, greater than or equal to about 3.5 g/cc, or about 3.6 g/cc to about 3.8 g/cc. In some embodiments, the specific capacity of the positive electrode active material for the rechargeable lithium battery may be greater than or equal to about 214 mAh/g. A rechargeable lithium battery including a positive electrode active material of one or more embodiments of the present disclosure may exhibit high energy density. For example, in some embodiments, in a rechargeable lithium battery, a volume capacity of the positive electrode to which the positive electrode active material is applied may be greater than or equal to about 700 mAh/cc, for example, about 700 mAh/cc to about 800 mAh/cc, about 750 mAh/cc to about 800 mAh/cc, about 760 mAh/cc to about 800 mAh/cc, and/or the like.

Method for Preparing Positive Electrode Active Material

In one or more embodiments, provided is a method of preparing a positive electrode active material for a rechargeable lithium battery, the method including mixing a first nickel-based composite hydroxide in a form of a secondary particle in which a plurality of primary particles are aggregated and at least a portion of the primary particles have a radially arranged structure, a second lithium nickel-based composite oxide having a monolith structure, a lithium raw material, and a boron raw material; and heat-treating the mixture. In this way, the aforementioned positive electrode active material may be prepared. Through the heat treatment process, the first nickel-based composite hydroxide reacts with the lithium raw material to prepare the first lithium nickel-based composite oxide coated with the boron-containing compound on the surface thereof, and the second lithium nickel-based composite oxide having a monolith structure is reheated so that the boron-containing compound is coated with on the surface thereof.

Because the method of manufacturing the positive electrode active material according to one or more embodiments is not to separately prepare the first lithium nickel-based composite oxide and the second lithium nickel-based composite oxide, respectively coat them, and then mix them, but to mix, for example, a precursor of the first positive electrode active material, the second positive electrode active material, the lithium raw material, and the boron raw material and concurrently (e.g., simultaneously) heat the mixture, not only the manufacturing method is simple and efficient, but also pellet density and initial discharge capacity of the final positive electrode active material are improved, which significantly increases capacity per volume of a rechargeable lithium battery and all improves initial charge and discharge efficiency and cycle-life characteristics of the rechargeable lithium battery.

In a related art example, when boron is coated on a positive electrode active material, nickel-based composite hydroxide is mixed with a lithium raw material and then, heat-treated to prepare a lithium nickel-based composite oxide, which is dry or wet mixed with a boron raw material and then, heat-treated again. The boron attached on the surface of the resulted positive electrode active material acts as resistance and deteriorates capacity and cycle-life of a rechargeable lithium battery.

In some embodiments, when either one of the first positive electrode active material and the second positive electrode active material (e.g., just one of the first positive electrode active material or the second positive electrode active material) is boron-coated and mixed with the other, or the first positive electrode active material and the second positive electrode active material are separately boron-coated and mixed together to prepare a positive electrode active material, compared with the positive electrode active material according to one or more embodiments of the present disclosure, there are problems of low pellet density, low energy density, and low initial discharge capacity and deteriorated initial charge and discharge efficiency and cycle-life characteristics for a rechargeable lithium battery. In contrast, the positive electrode active material prepared by the preparing method according to one or more embodiments of the present disclosure exhibits high pellet density and high initial discharge capacity and thus may significantly increase capacity per volume of a rechargeable lithium battery, secure high initial charge and discharge efficiency, and improve room-temperature and high-temperature cycle-life characteristics of the rechargeable lithium battery.

In the preparing method, the first nickel-based composite hydroxide (the precursor of the first positive electrode active material) may be in the form of a secondary particle in which at least a portion of primary particles are radially arranged, and may be prepared by a co-precipitation method and/or the like. For example, in one or more embodiments, a nickel raw material and optionally, a metal raw material other than the nickel are mixed to prepare a composite metal raw material, and then, a complexing agent and a pH controlling agent are added thereto to control pH of the mixture and perform a co-precipitation reaction. The prepared nickel-based composite hydroxide has a desired or suitable composition. The co-precipitation reaction may proceed in several steps (e.g., acts or tasks), for example, 2 steps, 3 steps, or 4 steps. In each step, a concentration of the complexing agent, an input/addition rate of the composite metal raw material, the pH range, a reaction temperature, reaction time, stirring power, and/or the like may be differently adjusted. Through these adjustments, a secondary particle-type or kind positive electrode active material precursor, in which at least a portion of primary particles are radially arranged, is prepared, and in addition, secondary particles having different internal and external shapes may also be prepared.

The first nickel-based composite hydroxide may be, for example, represented by Chemical Formula 11.

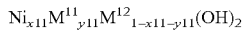   Chemical Formula 11

$Ni_{x11}M^{11}{}_{y11}M^{12}{}_{1-x11-y11}(OH)_2$   Chemical Formula 11

In Chemical Formula 11, 0.3≤x11≤1, 0≤y11≤0.7, and $M^{11}$ and $M^{12}$ may each independently be at least one element selected from Al, B, Ba, Ca, Ce, Co, Cr, F, Fe, Mg, Mn, Mo, Nb, P, S, Si, Sr, Ti, V, W, and Zr.

In some embodiments, the first nickel-based composite hydroxide may be represented by Chemical Formula 12 or Chemical Formula 13.

$Ni_{x12}Co_{y12}M^{13}{}_{1-x12-y12}(OH)_2$   Chemical Formula 12

In Chemical Formula 12, 0.3≤x12<1, 0<y12—0.7, and $M^{13}$ is at least one element selected from Al, B, Ba, Ca, Ce, Cr, F, Fe, Mg, Mn, Mo, Nb, P, S, Si, Sr, Ti, V, W, and Zr.

$Ni_{x13}Co_{y13}M^{14}{}_{z13}M^{15}{}_{1-x13-y13-z13}(OH)_2$   Chemical Formula 13

In Chemical Formula 13, 0.3≤x13≤0.98, 0.01≤y13≤0.69, 0.01—z13≤0.69, $M^{14}$ is at least one element selected from Al and Mn, and $M^{15}$ is at least one element selected from B, Ba, Ca, Ce, Cr, F, Fe, Mg, Mo, Nb, P, S, Si, Sr, Ti, V, W, and Zr.

An average particle diameter (D50) of the secondary particle of the first nickel-based composite hydroxide may be, for example, about 5 μm to about 25 μm, or about 8 μm to about 20 μm. The average particle diameter of the secondary particle of the first nickel-based composite hydroxide may be measured by a particle size analyzer utilizing a laser diffraction method.

The description of the radially arranged structure in the first nickel-based composite hydroxide may refer to the description of the radially arranged structure disclosed above. For example, the secondary particle of the first nickel-based composite hydroxide may include an inner portion having an irregular porous structure and an outer portion having a radially arranged structure as a region around (e.g., surrounding) the inner portion. The inner portion of the secondary particle has a porous structure, so that a diffusion distance of lithium ions to the inner portion is reduced, and the primary particles are radially arranged in the outer portion, so that lithium ions may be easily intercalated and deintercalated in the resulted first nickel-based composite oxide.

In one or more embodiments, in the first nickel-based composite hydroxide, at least a portion of the primary particles may have a plate shape. the secondary particle may have a radially arranged structure in which a long axis of the plate-shaped primary particles points the surface of the secondary particle.

The second lithium nickel-based composite oxide having a monolith structure may be prepared by mixing a second nickel-based composite hydroxide with a lithium raw material and then, heat-treating the mixture and optionally, pulverizing and/or grinding it and/or the like. In one or more embodiments, the heat treatment may be performed, for example, under an oxidizing gas atmosphere at about 800° C. to about 1100° C., or about 800° C. to about 1000° C. for about 1 hour to about 25 hours or for about 5 hours to about 20 hours. In some embodiments, the grinding is performed to obtain the monolith structure and may be different from crush and performed by utilizing a device such as a jet mill and/or the like. The second nickel-based composite hydroxide may be the same as or different from the aforementioned first nickel-based composite hydroxide, and may be represented by Chemical Formula 11, Chemical Formula 12, or Chemical Formula 13.

The second lithium nickel-based composite oxide may be represented by the aforementioned Chemical Formula 1, Chemical Formula 2, or Chemical Formula 3. An average particle diameter of the second lithium nickel-based composite oxide may be about 0.05 μm to about 8 μm, for example about 0.5 μm to about 5 μm. Meanwhile, the second lithium nickel-based composite oxide having a monolith structure may be expressed as the second lithium nickel-based composite oxide in a form of a single particle, or a single particle comprising the second lithium nickel-based composite oxide. The average particle diameter of the second lithium nickel-based composite oxide may refer to the average particle diameter of the single particle (the monolith structure) of the second lithium nickel-based composite oxide.

A mixing ratio of the first nickel-based composite hydroxide and the second lithium nickel-based composite oxide may be a weight ratio of about 5:5 to about 9:1, for example about 6:4 to about 9:1, about 6:4 to about 8:2, or about 7:3 to about 9:1. In the mixing ratio disclosed above, a positive electrode active material having high pellet density and high energy density, high capacity, and excellent or suitable cycle-life characteristics may be prepared.

The lithium raw material may be for example $Li_2CO_3$, LiOH, LiF, a hydrate thereof, or a combination thereof, and may be mixed in an amount of about 0.9 parts by mole to about 1.1 parts by mole, or about 0.9 parts by mole to about 1.05 parts by mole, or about 0.95 parts by mole to about 1.05 parts by mole based on 1 mole of the total amount of elements excluding oxygen and hydrogen in the first nickel-based composite hydroxide.

The boron raw material may be a compound containing boron, for example $H_3BO_3$, $HBO_2$, $B_2O_3$, $C_6H_5B(OH)_2$, $(C_6H_5O)_3B$, $[CH_3(CH_2)_3O]_3B$, $(C_3H_7O)_3B$, $C_3H_9B_3O_6$, $C_{13}H_{19}BO_3$, or a combination thereof.

An amount of the boron raw material may be about 0.01 parts by mole to about 0.5 parts by mole, for example about 0.01 parts by mole to about 0.3 parts by mole, or about 0.1 parts by mole to about 0.3 parts by mole based on 100 parts by mole of the total amount of elements excluding lithium, oxygen, and hydrogen in the first nickel-based composite hydroxide and the second lithium nickel-based composite oxide. When the amount of boron (e.g., mole amount) raw material satisfies the above range, boron does not act as resistance in the positive electrode active material and may serve to improve performance of the rechargeable lithium battery, thereby improving capacity and improving cycle-life characteristics of the rechargeable lithium battery. When the boron content (e.g., amount) raw material is excessive, boron may act as resistance in the positive electrode active material, reducing capacity and cycle-life of the battery.

In the preparing method according to one or more embodiments, the heat-treatment may be performed at a temperature of about 650° C. to about 850° C., or for example about 690° C. to about 780° C. In some embodiments, the heat treatment may be performed for about 5 hours to about 25 hours, for example about 5 hours to about 20 hours. With the above heat-treatment, a positive electrode active material having a high-capacity and high-energy density and including the first positive electrode active material and the second positive electrode active material which are stably coated with the boron-containing compound may be prepared. In the generally utilized coating method of mixing a lithium nickel-based composite oxide and a boron raw material for heat treatment in the related art, it is common to perform heat-treatment at a temperature much lower than the temperature disclosed herein, for example, at a temperature of less than or equal to about 600° C. In one or more embodiments of the present disclosure, it is distinguished in that the heat-treatment is performed at a higher temperature of about 650° C. to about 850° C. By performing heat-treatment in this temperature range, the first lithium nickel-based composite oxide in the form of a secondary particle having a radially arranged structure is obtained while coating with a boron-containing compound, in addition, the boron-containing compound may be coated on the surface of the second lithium nickel-based composite oxide having a monolith structure at the same time. As a result, the prepared positive electrode active material not only improves initial discharge capacity, initial efficiency, and cycle-life characteristics of the rechargeable lithium battery without increasing the resistance due to boron, but also increases a pellet density to improve capacity per volume of the rechargeable lithium battery.

In one or more embodiments, the heat-treatment may include a temperature-raising process and a temperature-maintaining process, wherein the temperature-raising time of the temperature-raising process may be longer than the temperature-maintaining time of the temperature-maintaining process. For example, the temperature-raising time may be about 6 hours to about 16 hours, and the temperature-maintaining time may be about 1 hour to about 9 hours, wherein the temperature-raising time may be longer than the temperature-maintaining time.

In the heat-treatment, the temperature-raising time may be, for example, about 6 hours to about 15 hours, about 6 hours to about 14 hours, about 6 hours to about 13 hours, or about 7 hours to about 12 hours, and the temperature-maintaining time may be about 2 hours to about 9 hours or about 3 hours to about 8 hours.

In some embodiments, a ratio of (the temperature-raising time):(the temperature-maintaining time) may be about 1.1:1 to about 10:1, for example, about 1.1:1 to about 8:1, about 1.1:1 to about 6:1, about 1.1:1 to about 5:1, or about 1.1:1 to about 4:1.

In this way, the heat-treatment profile is adjusted to effectively prepare the first positive electrode active material in the form of high-efficiency radial secondary particles and to stably coat an appropriate or suitable amount of the boron-containing compound on the first positive electrode active material and the second positive electrode active material.

Positive Electrode

The positive electrode for a rechargeable lithium battery may include a current collector and a positive electrode active material layer on the current collector. The positive electrode active material layer may include a positive electrode active material according to one or more embodiments of the present disclosure, and may further include a binder and/or a conductive material.

The binder improves binding properties of positive electrode active material particles with one another and with a current collector. Examples of the binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The amount of the binder in the positive electrode active material layer may be about 1 wt % to about 5 wt % based on the total weight of the positive electrode active material layer.

A conductive material may be included to provide electrode conductivity. Any electrically conductive material may be utilized as a conductive material unless it causes a chemical change. Non-limiting examples of the conductive material may include a carbon-based material such as natural graphite, artificial graphite, carbon black, acetylene black, ketjen black, a carbon fiber, carbon nanotube, and/or the like; a metal-based material of a metal powder or a metal fiber including copper, nickel, aluminum, silver, and/or the like; a conductive polymer such as a polyphenylene derivative; or a mixture thereof.

The amount of the conductive material in the positive electrode active material layer may be about 1 wt % to about 5 wt % based on the total weight of the positive electrode active material layer.

In one or more embodiments, an aluminum foil may be utilized as the positive electrode current collector, but the present disclosure is not limited thereto.

Negative Electrode

The negative electrode for a rechargeable lithium battery may include a current collector and a negative electrode active material layer on the current collector. The negative electrode active material layer may include a negative electrode active material and may further include a binder and/or a conductive material.

The negative electrode active material may include a material that reversibly intercalates/deintercalates lithium ions, a lithium metal, a lithium metal alloy, a material capable of doping/dedoping lithium, and/or transition metal oxide.

The material that reversibly intercalates/deintercalates lithium ions may include, for example crystalline carbon, amorphous carbon, or a combination thereof as a carbon-based negative electrode active material. The crystalline carbon may be non-shaped (irregularly shaped), or sheet, flake, spherical, or fiber shaped natural graphite or artificial graphite. The amorphous carbon may be a soft carbon, a hard carbon, a mesophase pitch carbonization product, calcined coke, and/or the like.

The lithium metal alloy may include an alloy of lithium and at least one metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be a Si-based negative electrode active material or a Sn-based negative electrode active material. The Si-based negative electrode active material may include silicon, a silicon-carbon composite, $SiO_x$ ($0<x<2$), a Si-Q alloy (wherein Q is an alkali metal, an alkaline-earth metal, a Group 13 element, a Group 14 element, a Group 15 element, a Group 16 element, a transition metal, a rare earth element, or a combination thereof, but not Si), and the Sn-based negative electrode active material may include Sn, $SnO_2$, a Sn—R alloy (wherein R is an alkali metal, an alkaline-earth metal, a Group 13 element, a Group 14 element, a Group 15 element, a Group 16 element, a transition metal, a rare earth element, or a combination thereof, but not Sn). At least one of these materials may be mixed with $SiO_2$. The elements Q and R may be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorous (P), arsenic (As), antimony (Sb), bismuth (Bi), sulfur (S), selenium (Se), tellurium (Te), polonium (Po), and combinations thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. An amorphous carbon precursor may be a coal-based pitch, mesophase pitch, petroleum-based pitch, coal-based oil, petroleum-based heavy oil, and/or a polymer resin such as a phenol resin, a furan resin, or a polyimide resin. In some embodiments, the amount of silicon may be about 10 wt % to about 50 wt % based on the total weight of the silicon-carbon composite. In some embodiments, the amount of the crystalline carbon may be about 10 wt % to about 70 wt % based on the total weight of the silicon-carbon composite, and the amount of the amorphous carbon may be about 20 wt % to about 40 wt % based on the total weight of the silicon-carbon composite. In some embodiments, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may exist in an oxidized form. For example, in one or more embodiments, an atomic amount ratio of Si:O in the silicon particles indicating a degree of oxidation may be a weight ratio of about 99:1 to about 33:67. The silicon particles may be $SiO_x$ particles, for example, the range of x in $SiO_x$ may be greater than about 0 and less than about 2.

The Si-based negative electrode active material or Sn-based negative electrode active material may be mixed with the carbon-based negative electrode active material. When the Si-based negative electrode active material or Sn-based negative electrode active material and the carbon-based negative electrode active material are mixed and utilized, the mixing ratio may be a weight ratio of about 1:99 to about 90:10.

In the negative electrode active material layer, the negative electrode active material may be included in an amount of about 95 wt % to about 99 wt % based on the total weight of the negative electrode active material layer.

In one or more embodiments, the negative electrode active material layer may further include a binder, and may optionally further include a conductive material. The amount of the binder in the negative electrode active material layer may be about 1 wt % to about 5 wt % based on the total weight of the negative electrode active material layer. In some embodiments, when the conductive material may be further included, the negative electrode active material layer may include about 90 wt % to about 98 wt % of the negative electrode active material, about 1 wt % to about 5 wt % of the binder, and about 1 wt % to about 5 wt % of the conductive material.

The binder serves to well adhere the negative electrode active material particles to each other and to adhere the negative electrode active material to the current collector. The binder may be a water-insoluble binder, a water-soluble binder, or a combination thereof.

Non-limiting examples of the water-insoluble binder may include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and combinations thereof.

When a water-soluble binder is utilized as the negative electrode binder, a cellulose-based compound capable of imparting viscosity (e.g., as a thickener) may be further included. As the cellulose-based compound, one or more of carboxymethyl cellulose, hydroxypropylmethyl cellulose, methyl cellulose, or alkali metal salts thereof may be mixed and utilized. As the alkali metal, Na, K and/or Li may be utilized. The amount of the thickener utilized may be about 0.1 parts by weight to about 3 parts by weight based on 100 parts by weight of the negative electrode active material.

The conductive material may be included to provide electrode conductivity. Any electrically conductive material may be utilized as a conductive material unless it causes a chemical change. Non-limiting examples of the conductive material may include a carbon-based material such as natural graphite, artificial graphite, carbon black, acetylene black, ketjen black, a carbon fiber, carbon nanotube, and/or the like; a metal-based material of a metal powder or a metal fiber including copper, nickel, aluminum silver, and/or the like; a conductive polymer such as a polyphenylene derivative; or a mixture thereof.

The negative electrode current collector may include one selected from a copper foil, a nickel foil, a stainless steel foil, a titanium foil, a nickel foam, a copper foam, a polymer substrate coated with a conductive metal, and a combination thereof.

Rechargeable Lithium Battery

One or more embodiments of the present disclosure further provide a rechargeable lithium battery including a positive electrode including a positive electrode active material of one or more embodiments of the present disclosure, a negative electrode, a separator between the positive electrode and the positive electrode, and an electrolyte.

Figure 4:
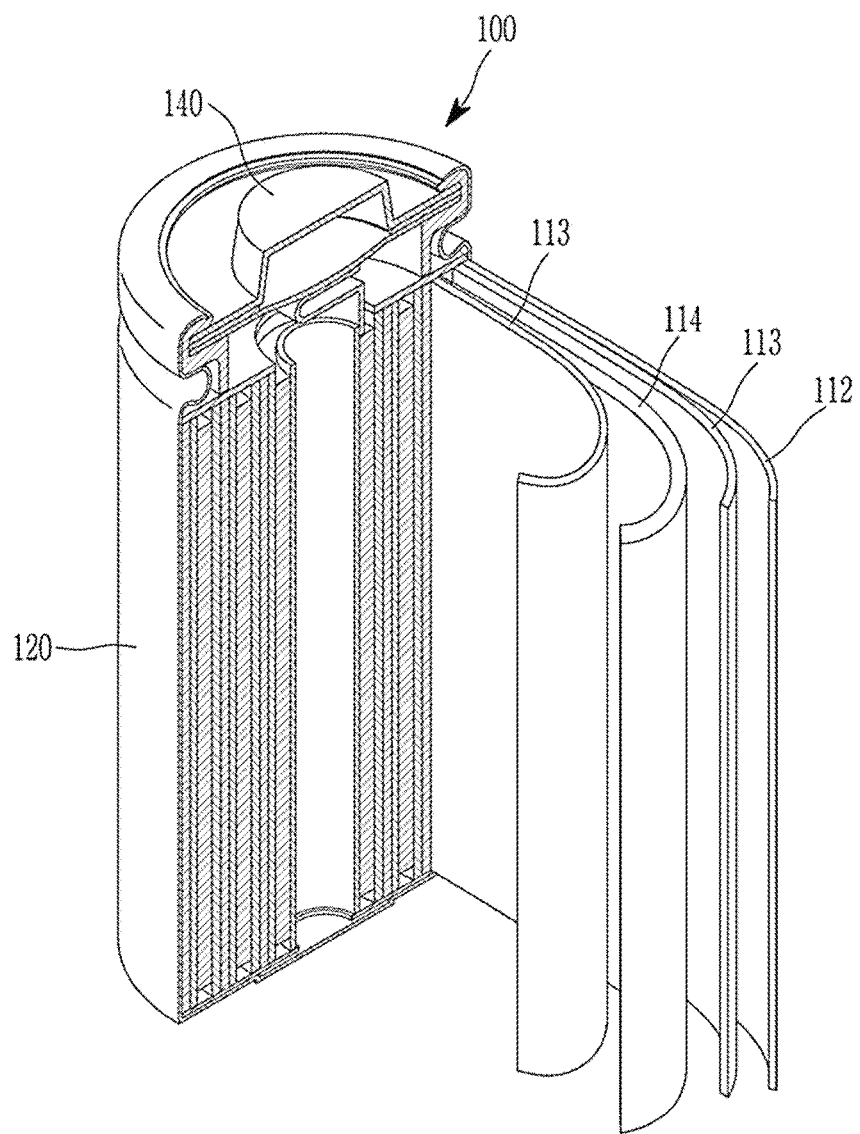
FIG. 4 is a schematic view illustrating a rechargeable lithium battery according to one or more embodiments of the present disclosure.

FIG. 4 is a schematic view illustrating a rechargeable lithium battery 100 according to one or more embodiments of the present disclosure. Referring to FIG. 4, the rechargeable lithium battery 100 may include a battery cell including a positive electrode 114 including a positive electrode active material of one or more embodiments of the present disclosure, a negative electrode 112 facing the positive electrode 114, a separator 113 between the positive electrode 114 and the negative electrode 112, an electrolyte for a rechargeable lithium battery impregnating the positive electrode 114, negative electrode 112, and separator 113, a battery case 120 containing the battery cell, and a sealing member 140 sealing the battery case 120.

The electrolyte may include a non-aqueous organic solvent and a lithium salt.

The non-aqueous organic solvent serves as a medium for transmitting ions taking part in the electrochemical reaction of a battery. The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent may include cyclohexanone, and/or the like. In some embodiments, the alcohol-based solvent may include ethanol, isopropyl alcohol, and/or the like, and the aprotic solvent may include nitriles such as R—CN (wherein, R is a C2 to C20 linear, branched, or cyclic hydrocarbon group, and may include a double bond, an aromatic ring, or an ether bond), and/or the like, amides such as dimethyl formamide, and/or the like, dioxolanes such as 1,3-dioxolane, sulfolanes, and/or the like.

The non-aqueous organic solvent may be utilized alone or in a mixture. When the non-aqueous organic solvent is utilized in a mixture, the mixture ratio may be controlled or selected in accordance with a desirable battery performance.

In some embodiments, the carbonate-based solvent may include a mixture with a cyclic carbonate and a chain carbonate. In one embodiment, when the cyclic carbonate and the chain carbonate are mixed in a volume ratio of about 1:1 to about 1:9, the electrolyte may exhibit excellent or suitable performance.

The non-aqueous organic solvent may further include an aromatic hydrocarbon-based organic solvent in the carbonate-based solvent. In one or more embodiments, the carbonate-based solvent and the aromatic hydrocarbon-based organic solvent may be mixed in a volume ratio of about 1:1 to about 30:1.

As the aromatic hydrocarbon-based solvent, an aromatic hydrocarbon-based compound represented by Chemical Formula I may be utilized.

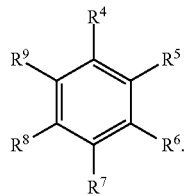

Chemical Formula I

In Chemical Formula I, $R^4$ to $R^9$ may each independently be the same or different and be selected from hydrogen, a halogen, a C1 to C10 alkyl group, and a C1 to C10 haloalkyl group.

Non-limiting examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound of Chemical Formula II in order to improve cycle-life of a rechargeable lithium battery.

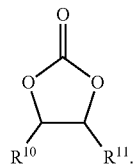

Chemical Formula II

In Chemical Formula II, $R^{10}$ and $R^{11}$ may each independently be the same or different, and be selected from hydrogen, a halogen, a cyano group, a nitro group, and fluorinated C1 to C5 alkyl group, provided that at least one of $R^{10}$ and $R^{11}$ is selected from a halogen, a cyano group, a nitro group, and fluorinated C1 to C5 alkyl group, but both (e.g., simultaneously) of $R^{10}$ and $R^{11}$ are not hydrogen.

Non-limiting examples of the ethylene-based carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of an additive such as an ethylene-based carbonate-based compound for improving cycle-life may be utilized within an appropriate or suitable range.

The lithium salt dissolved in the non-aqueous organic solvent supplies lithium ions in a rechargeable lithium battery, enables a basic operation of the rechargeable lithium battery, and improves transportation of the lithium ions between positive and negative electrodes.

Non-limiting examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$ (wherein x and y are natural numbers, for example, an integer in a range of 1 to 20), lithium difluoro(bisoxalato) phosphate, LiCl, LiI, $LiB(C_2O_4)_2$ (lithium bis(oxalato) borate, LiBOB), and lithium difluoro(oxalato)borate (LiDFOB).

The lithium salt may be utilized in a concentration in a range of about 0.1 M to about 2.0 M. When the lithium salt is included at the above concentration range, an electrolyte may have excellent or suitable performance and lithium ion mobility due to optimal or suitable electrolyte conductivity and viscosity.

The separator 113 separates a positive electrode 114 and a negative electrode 112 and provides a transporting passage for lithium ions and may be any generally-utilized separator in a lithium ion battery. In other words, it may have low resistance to ion transport and excellent or suitable impregnation for an electrolyte. For example, the separator 113 may include glass fiber, polyester, polyethylene, polypropylene, polytetrafluoroethylene, or a combination thereof, and may be in the form of a non-woven fabric or a woven fabric. For example, in a lithium ion battery such as a rechargeable lithium battery, a polyolefin-based polymer separator such as polyethylene and polypropylene may be mainly utilized. In some embodiments, in order to ensure the heat resistance or mechanical strength, a coated separator including a ceramic component, or a polymer material may be utilized. Optionally, it may have a mono-layered or multi-layered structure.

Rechargeable lithium batteries may be classified as lithium ion batteries, lithium ion polymer batteries, and lithium polymer batteries according to the presence of a separator and the kind of electrolyte utilized therein. The rechargeable lithium batteries may have a variety of shapes and sizes, and may include cylindrical, prismatic, coin, or pouch-type or kind batteries, and may be thin film batteries or may be rather bulky in size. Structures and manufacturing methods for lithium ion batteries pertaining to this disclosure are well suitable in the art.

The rechargeable lithium battery according to one or more embodiments of the present disclosure may be utilized in an electric vehicle (EV), a hybrid electric vehicle such as a plug-in hybrid electric vehicle (PHEV), and a portable electronic device because it implements a high capacity and has excellent or suitable storage stability, cycle-life characteristics, and high rate characteristics at high temperatures.

Hereinafter, examples of the present disclosure and comparative examples are described. It is to be understood, however, that the examples are for the purpose of illustration and are not to be construed as limiting the present disclosure. The design details of the positive electrode active materials of examples and comparative examples are briefly shown in Table 1.

Example 1

1. Preparation of Positive Electrode Active Material (1) Preparation of First Nickel-Based Composite Hydroxide A first nickel-based composite hydroxide ($Ni_{0.945}Co_{0.04}Al_{0.015}(OH)_2$), a precursor of the first positive electrode active material, was synthesized through a co-precipitation method, which will be described later. Nickel sulfate, cobalt sulfate and sodium aluminum sulfate were utilized as metal raw materials in the following preparing process.

[First step: 2.5 kW/m$^3$, NH$_4$OH 0.40 M, pH 10.5 to 11.5, and reaction time of 6 hours]

First, ammonia water having a concentration of 0.40 M was put in a reactor. While metal raw materials and a complexing agent (NH$_4$OH) were added thereto respectively at 85 mL/min and 10 mL/min at 50° C. under a stirring power of 2.5 kW/m$^3$, a reaction was started.

While NaOH was added thereto to maintain pH of the reaction solution, the reaction was performed for 6 hours. As a result of the reaction, it was confirmed that the average sizes of the obtained core particles were in the range of about 6.5 μm to 7.5 μm, and the second step was performed as follows.

[Second step: 2.0 kW/m$^3$, NH$_4$OH 0.45 M, pH 10.5 to 11.5, and reaction time of 18 hours]

The metal raw materials and the complexing agent were added thereto respectively at 85 mL/min and 12 mL/min, while the reaction temperature was maintained at 50° C., so that a concentration of the complexing agent was maintained to be 0.45 M. While adding NaOH thereto to maintain pH of the reaction solution, the reaction was performed for 18 hours. At this time, the stirring power was lowered to 2.0 kW/m$^3$, which was lower than the stirring power utilized in the first step, and the reaction proceeds. After the reaction was performed, it was confirmed that the average sizes of the product particles containing the core and the intermediate layer were 13.5 μm to 14 μm, and the third step was performed as follows.

[Third step: 1.5 kW/m$^3$, NH$_4$OH 0.45 M, pH 10.5 to 11.5, and reaction time of 14 hours]

While maintaining the reaction temperature at 50° C., input rates of the metal raw materials and the complexing agent and the concentration of the complexing agent were the same as in second step. While adding NaOH thereto to maintain pH of the reaction solution, the reaction was performed for 14 hours. At this time, the stirring power was lowered to 1.5 kW/m$^3$, which is lower than the stirring power utilized in the second step, and the reaction proceeded.

Post-Process

After the resultant was washed, the washed resultant was dried with hot air at about 150° C. for 24 hours to obtain a first nickel-based composite hydroxide ($Ni_{0.945}Co_{0.04}Al_{0.015}OH)_2$).

(2) Preparation of Second Lithium Nickel-Based Composite Oxide

A nickel-based composite hydroxide ($Ni_{0.94}Co_{0.04}Al_{0.01}Mn_{0.01}(OH)_2$), which was a precursor of the second positive electrode active material, was synthesized through the co-precipitation method. Nickel sulfate (NiSO$_4$·6H$_2$O) as a metal raw material, cobalt sulfate (CoSO$_4$·7H$_2$O), sodium aluminum sulfate (NaAl(SO$_4$)$_2$·12H$_2$O), and manganese sulfate (MnSO$_4$·H$_2$O) in a mole ratio of 94:4:1:1 were dissolved in distilled water as a solvent to prepare a mixed solution. The subsequent synthesis process was the same as the preparation process of the first nickel-based composite hydroxide.

The nickel-based composite hydroxide prepared in the method was mixed with the hydroxide lithium in a mole ratio of 1:1 and then, heat-treated at 850° C. under an oxygen atmosphere. The resultant was ground to have an average particle diameter (D50) of about 3 μm with an airflow collision grinder, obtaining monocrystalline lithium nickel-based composite oxide ($LiNi_{0.94}Co_{0.04}Al_{0.01}Mn_{0.01}O_2$), a second positive electrode active material.

(3) Preparation of Mixed Positive Electrode Active Material

The first nickel-based composite hydroxide and the second lithium nickel-based composite oxide were mixed in a weight ratio of 7:3, LiOH was added thereto to satisfy a mole ratio of Li/(Ni+Co+Al)=0.96 in a relationship of the first nickel-based composite hydroxide and LiOH, and 0.125 mol % of boric acid based on a total amount of the elements excluding Li, O, and H in the mixture was added thereto and then, put in a furnace, raised the temperature up to 700° C. for 8 hours, and maintained the temperature of 700° C. for 7 hours under an oxygen atmosphere to perform heat treatment, obtaining a mixed positive electrode active material.

In the obtained final positive electrode active material, the first positive electrode active material was first lithium nickel-based composite oxide ($Li_{0.96}Ni_{0.945}Co_{0.04}Al_{0.015}O_2$) and had a form of a secondary particle having a radially arranged structure of which the surface was coated with a boron-containing compound, and which had an average particle diameter of about 13.8 μm. The second positive electrode active material was second lithium nickel-based composite oxide, had a monolith structure, was coated with a boron-containing compound on the surface thereof, and had an average particle diameter of about 3 μm.

2. Manufacture of Rechargeable Lithium Battery Cell 96 g of the obtained positive electrode active material, 2 g of polyvinylidene fluoride, 137 g of N-methylpyrrolidone as a solvent, 2 g of carbon black as a conductive agent (i.e., conductive material) were mixed in a mixer and air bubbles were removed to uniformly disperse the mixture to prepare a slurry for a positive electrode active material layer The slurry for the positive electrode active material layer was coated on an aluminum foil into an electrode plate and then, dried at 135° C. for at least 3 hours, roll-pressed, and vacuum-dried, to manufacture a positive electrode.

The positive electrode and a lithium metal counter electrode were utilized to manufacture a 2032 type or kind coin half-cell. Between the positive electrode and the lithium metal counter electrode, a separator formed of an about 16 μm-thick porous polyethylene film was interposed, and an electrolyte solution was injected thereinto. The electrolyte solution was prepared by mixing ethylenecarbonate (EC) and ethylmethylcarbonate (EMC) in a volume ratio of 3:5 and dissolving 1.1 M LiPF$_6$ in the mixed solvent.

Example 2

A positive electrode active material was prepared in substantially the same method as in Example 1 except the boric acid was mixed in an amount of 0.3 mol %, and a battery cell was manufactured in substantially the same method as in Example 1.

Example 3

A positive electrode active material was prepared in substantially the same method as in Example 1 except the boric acid was mixed in an amount of 0.5 mol %, and a battery cell was manufactured in substantially the same method as in Example 1.

Comparative Example 1

A first nickel-based composite hydroxide and a second lithium nickel-based composite oxide were manufactured in substantially the same preparing process as in Example 1, and then, the boron coating and mixing processes of the first lithium nickel-based oxide and the second lithium nickel-based oxide were performed as follows. Comparative Example 1 was a case of separately preparing a first positive electrode active material and separately boron-coating a second positive electrode active material alone and then, mixing them.

Preparation of First Lithium Nickel-Based Composite Oxide

The first nickel-based composite hydroxide of Example 1 and LiOH were mixed in a mole ratio of 1:1 and then, heat-treated about at 700° C. under an oxygen atmosphere for 10 hours, obtaining first lithium nickel-based composite oxide ($LiNi_{0.945}Co_{0.04}Al_{0.015}O_2$). The first lithium nickel-based composite oxide had an average particle diameter of about 13.8 μm. This was utilized as the first positive electrode active material of Comparative Example 1.

Boron Coating of Second Lithium Nickel-Based Composite Oxide

The second lithium nickel-based composite oxide having a monolith structure prepared in Example 1 and 0.19 wt % (or 0.3 mol %) of boric acid were mixed with a dry mixer, and then heat-treated at 350° C. for 8 hours. As a result, a second positive electrode active material according to Comparative Example 1 in which a boron-containing compound was coated on the surface of the second lithium nickel-based composite oxide having a monolith structure was obtained.

Preparation of Mixed Positive Electrode Active Material

The first positive electrode active material and the second positive electrode active material were mixed in a weight ratio of 8:2 to prepare a mixed final positive electrode active material.

In the positive electrode active material of Comparative Example 1, the first positive electrode active material was in the form of secondary particles having a radially arranged structure but not coated with a boron-containing compound, and the second positive electrode active material had a monolith structure and was coated with the boron-containing compound.

Subsequently, a rechargeable lithium battery cell was manufactured in substantially the same method as in Example 1.

Comparative Example 2

A positive electrode active material was prepared in substantially the same method as in Comparative Example 1 except that the second lithium nickel-based composite oxide was not coated with the boron-containing compound. In addition, a rechargeable lithium battery cell was manufactured in substantially the same method as in Example 1. In Comparative Example 2, the first positive electrode active material and the second positive electrode active material were separately prepared without the boron coating and then, mixed.

Comparative Example 3

A positive electrode active material was prepared in substantially the same method as in Comparative Example 1 except that the second lithium nickel-based composite oxide was prepared as in the following method but not coated with the boron-containing compound. In Comparative Example 3, the first positive electrode active material and the second positive electrode active material in the form of a secondary particle were respectively prepared without the boron coating and then, mixed.

Preparation of Second Lithium Nickel-Based Composite Oxide

As metal raw materials, nickel sulfate ($NiSO_4 \cdot 6H_2O$), cobalt sulfate ($CoSO_4 \cdot 7H_2O$), and sodium aluminum sulfate ($NaAl(SO_4)_2 \cdot 12H_2O$) in a mole ratio of 94.5:4:1.5 were mixed in distilled water as a solvent to prepare a metal raw material mixed solution, and in addition, ammonia water ($NH_4OH$) for forming a complex compound and sodium hydroxide (NaOH) as a precipitant were prepared.

After adding the dilute ammonia water solution to a substantially continuous reactor, the metal raw material mixed solution was continuously added, and sodium hydroxide was added to maintain the pH inside the reactor. The mixture was slowly reacted for about 80 hours, and when the reaction was stabilized, a product overflown therefrom was collected and then, washed and dried, to obtain a final precursor. The resulting material was washed, dried with hot air at about 150° C. for 24 hours, to prepare nickel-based composite hydroxide ($Ni_{0.945}Co_{0.04}Al_{0.015}(OH)_2$) with an average particle diameter (D50) of 4 μm.

The obtained nickel composite hydroxide and LiOH were mixed in a mole ratio of 1:0.98 and then, heat-treated under an oxygen atmosphere at 700° C. for 8 hours, to prepare a second positive electrode active material ($Li_{0.98}Ni_{0.945}Co_{0.04}Al_{0.015}O_2$) having a secondary particle form in which a plurality of primary particles were aggregated and an average particle diameter (D50) of 4 μm. This was utilized as a second positive electrode active material according to Comparative Example 3.

Subsequently, the first positive electrode active material of Comparative Example 1 and the second positive electrode active material of Comparative Example 3 were mixed in a weight ratio of 7:3 to prepare a final positive electrode active material, which was utilized in substantially the same manner as in Example 1 to manufacture a rechargeable lithium battery cell.

In the positive electrode active material of Comparative Example 3, the first positive electrode active material was in the form of a secondary particle having a radially arranged structure but not coated with a boron-containing compound, and the second positive electrode active material had no monolith structure but a form of a secondary particle in which a plurality of primary particles were aggregated and which was not coated with a boron-containing compound.

Comparative Example 4

A positive electrode active material was prepared in substantially the same method as in Comparative Example 1 except that the first lithium nickel-based composite oxide was prepared in the following preparing process. In Comparative Example 4, the first positive electrode active material and the second positive electrode active material were separately boron-coated and then, mixed.

Preparation of First Lithium Nickel-Based Composite Oxide

The first nickel-based composite hydroxide according to Example 1 and LiOH were mixed in a mole ratio of 1:1, dry-mixed with 0.084 wt % of boric acid (or 0.125 mol %), and then, heat-treated under an oxygen atmosphere at about 700° C. for 10 hours, to obtain first lithium nickel-based composite oxide (LiNi$_{0.945}$Co$_{0.04}$Al$_{0.015}$O$_2$) coated with a boron-containing compound on the surface thereof. The obtained first lithium nickel-based composite oxide had an average particle diameter of 13.8 μm. This was utilized as a first positive electrode active material according to Comparative Example 4

The second positive active material was prepared in substantially the same manner as in Comparative Example 1 except that 0.125 mol % of boric acid was used to prepare the second positive active material. Subsequently, the first positive electrode active material and the second positive electrode active material were mixed in a weight ratio of 7:3 to prepare a final positive electrode active material, which was utilized in substantially the same manner as in Example 1 to manufacture a rechargeable lithium battery cell.

In the final positive electrode active material of Comparative Example 4, the first positive electrode active material had a form of a secondary particle having a radially arranged structure and coated with a boron-containing compound, and the second positive electrode active material had a monolith structure and was coated with a boron-containing compound. However, Comparative Example 4 was a case of coating the first positive electrode active material and the second positive electrode active material separately with the boron-containing compound and then, mixing them.

Figure 5:
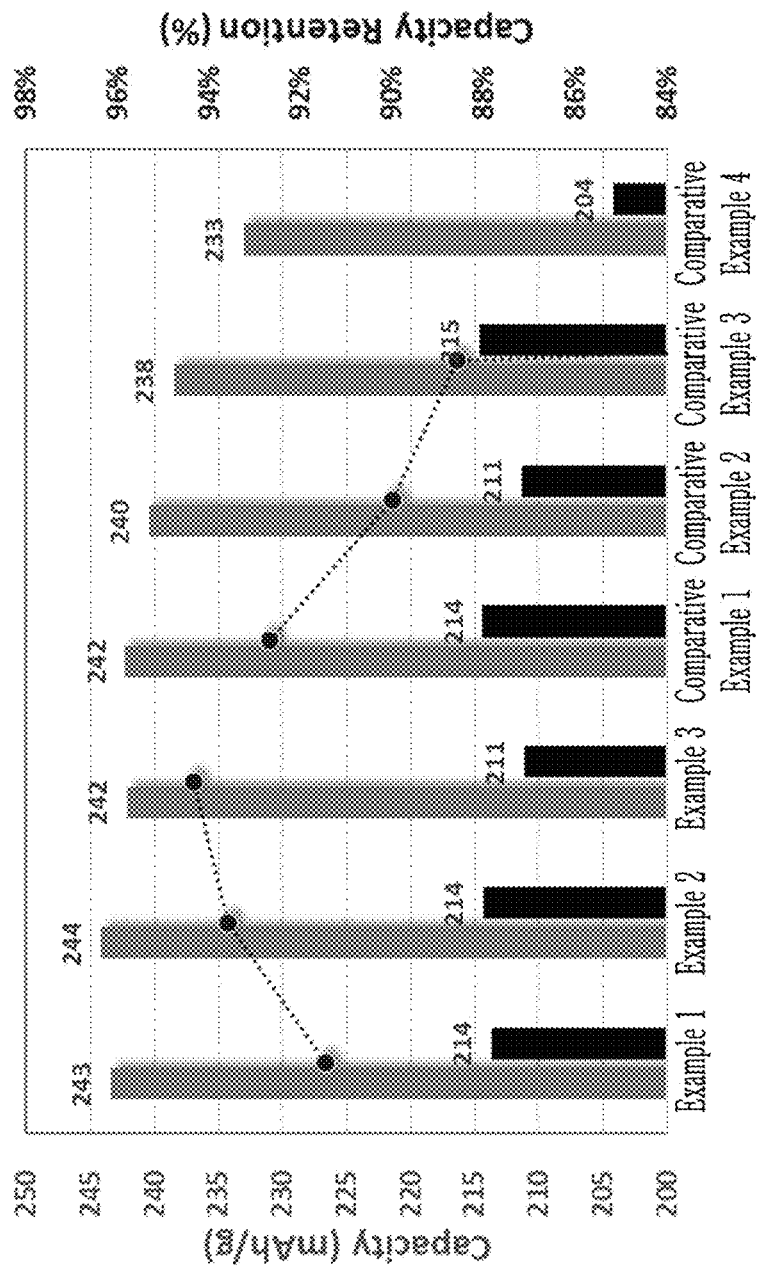
FIG. 5 is a graph showing the initial charge/discharge capacity and the 50th cycle capacity retention rate for battery cells manufactured in Comparative Examples 1 to 4 and Examples 1 to 3.

Evaluation Example 1: Charge and Discharge Capacity, Charge and Discharge Efficiency, and Cycle-Life Characteristics The coin half-cells according to Examples 1 to 3 and Comparative Examples 1 to 4 were constant current-charged within a range of 3.0 V to 4.25 V and constant voltage-charged to 0.05 C and then, discharged to 3.0 V at 25° C. to measure initial charge and discharge capacity, and the results are shown in Table 1 and FIG. 5. Subsequently, the cells were charged to an upper limit voltage of 4.3 V at constant current of 1 C and discharged to a discharge cut-off voltage of 3.0 V at 1 C at 45° C., which was 50 times repeated to measure a ratio of discharge capacity at the 50$^{th}$ cycle relative to discharge capacity at the 1$^{st}$ cycle and calculate capacity retention at the 50$^{th}$ cycle, and the results are shown in Table 1 and FIG. 5. In FIG. 5, the gray bar graph represents the initial charge capacity, the black bar graph represents discharge capacity, and the dotted line graph represents the capacity retention at the 50$^{th}$ cycle.

Figure 6:
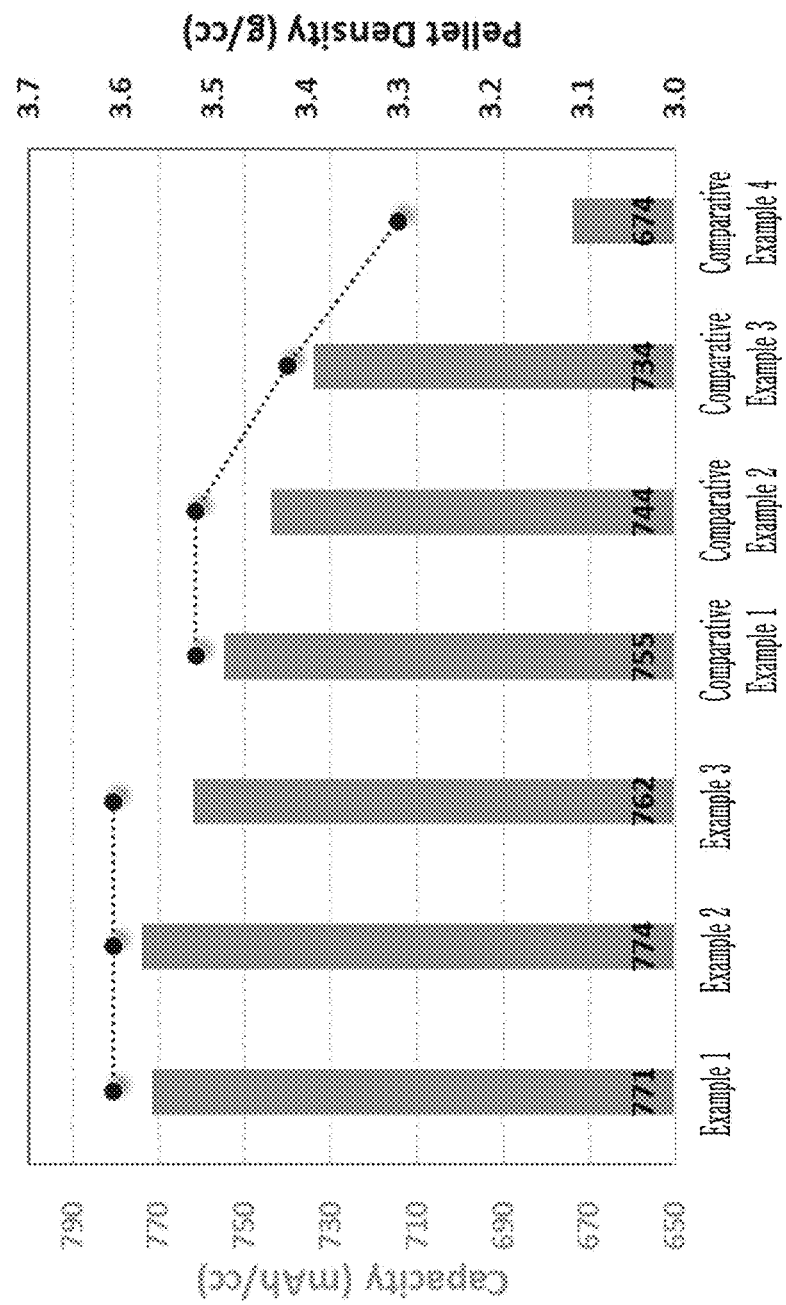
FIG. 6 is a graph showing the pellet density and capacity per volume for battery cells manufactured in Comparative Examples 1 to 4 and Examples 1 to 3.

3 g of each positive electrode active material of Examples 1 to 3 and Comparative Examples 1 to 4 was put in a pellet mold and pressed with a force of US 3.3 tons for 30 seconds and then, measured with respect to pellet density. The pellet density was multiplied with the initial discharge capacity to calculate capacity per volume, which is shown in Table 1, and the pellet density and the capacity per volume are shown in FIG. 6. In FIG. 6, the dotted line graph represents the pellet density, and the bar graphs represent the capacity per volume.

TABLE 1

| | First positive electrode active material | | Second positive electrode active material | | | | | |
|---|---|---|---|---|---|---|---|---|
| | Structure | Boron input amount (mol %) | Structure | Boron input amount (mol %) | Simultaneous coating | Initial discharge capacity (mAh/g) | 50 cycles capacity retention (%) | Capacity per volume (mAh/cc) |
| Ex. 1 | radial secondary particle | 0.125 | monolith | 0.125 | ○ | 213.7 | 91.5 | 771 |
| Ex. 2 | radial secondary particle | 0.3 | monolith | 0.3 | ○ | 214.3 | 93.6 | 774 |
| Ex. 3 | radial secondary particle | 0.5 | monolith | 0.5 | ○ | 211.1 | 94.3 | 762 |
| Comp. Ex. 1 | radial secondary particle | 0 | monolith | 0.3 | X | 214.4 | 92.7 | 755 |
| Comp. Ex. 2 | radial secondary particle | 0 | monolith | 0 | X | 211.4 | 90 | 744 |
| Comp. Ex. 3 | radial secondary particle | 0 | secondary particle | 0 | X | 214.6 | 88.6 | 734 |
| Comp. Ex. 4 | radial secondary particle | 0.125 | monolith | 0.125 | X | 204.2 | — | 674 |

Referring to Table 1 and FIGS. 5 and 6, Comparative Example 2 utilizing the second positive electrode active material having a monolith structure exhibited improved capacity retention at the 50$^{th}$ cycle but reduced initial discharge capacity, compared with Comparative Example 3 utilizing the second positive electrode active material utilizing general secondary particles rather than ones with the monolith structure. However, Comparative Example 1 utilizing the second positive electrode active material coated with a boron-containing compound and having a monolith structure improved 50 cycles capacity retention without reducing the initial discharge capacity, compared with Comparative Example 3, and when mixed with the second positive electrode active material having a monolith structure, the capacity per volume was further improved. On the other hand, as in Comparative Example 4, when the first positive electrode active material and the second positive electrode active material having a monolith structure were separately coated with a boron-containing compound, capacity per volume was very deteriorated. Comparative Example 4 exhibited reduced capacity per volume, compared with Comparative Example 2, wherein the boron-containing compound coating reduced initial discharge capacity and significantly reduced the pellet density from 3.52 g/cc to 3.3 g/cc.

However, as suggested in the present disclosure, when the first nickel-based composite hydroxide and the second lithium nickel-based composite oxide having a monolith structure were mixed and concurrently (e.g., simultaneously) coated with a boron-containing compound according to each of Examples 1 to 3, the pellet density and the capacity per volume were much improved, while initial discharge capacity, initial charge and discharge efficiency, and high temperature cycle-life were also concurrently (e.g., simultaneously) improved.

For example, Examples 1 to 3, compared with Comparative Example 3 utilizing the second positive electrode active material not having a monolith structure, exhibited improved 50 cycles capacity retention, pellet density, and capacity per volume without deteriorating initial discharge capacity and in addition, compared with Comparative Example 2 utilizing the second positive electrode active material having a monolith structure but not coating the first positive electrode active material and the second positive electrode active material with a boron-containing compound, exhibited all improved initial discharge capacity and 50 cycles capacity retention and also, improved pellet density and capacity per volume.

In addition, Examples 1 to 3 utilizing the second positive electrode active material having a monolith structure and coated with a boron-containing compound, compared with Comparative Example 1 not introducing the boron-containing compound coating into the first positive electrode active material, exhibited an effect of markedly increasing the pellet density and the capacity per volume without deteriorating the initial discharge capacity and the 50 cycles capacity retention, and in particular, comparing Example 1 with Comparative Example 4 coated with the same amount of a boron-containing compound, Example 1 exhibited much improved initial discharge capacity and capacity per volume.

On the other hand, Example 3 utilizing 0.5 mol % of the boron-containing compound exhibited improved 50 cycles capacity retention and maintained high pellet density but a little deteriorated initial discharge capacity and thereby reduced capacity per volume. Accordingly, Examples 1 and 2 utilizing less than or equal to 0.3 mol % of the boron-containing compound, compared with Example 3, were more advantageous in improving the capacity per volume.

Evaluation Example 2: Component Analysis of Active Material Surface

Figure 7:
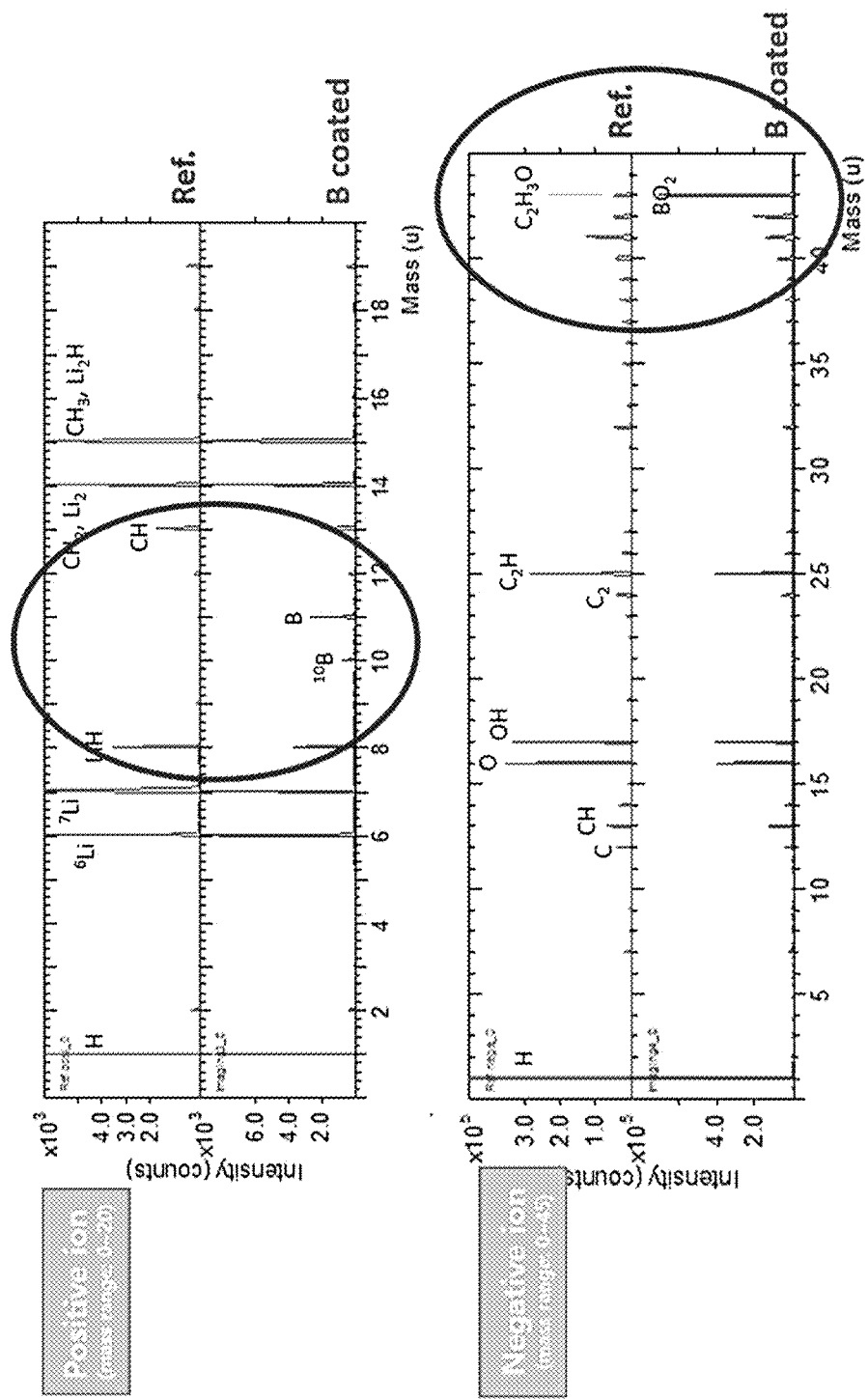
FIG. 7 is a time-of-flight secondary ion mass spectrometry (ToF-SIMS) mass spectrometry spectrum of a positive electrode active material prepared in Example 1.

FIG. 7 is a mass spectrum result of ToF-SIMS (Time-of-Flight Secondary Ion Mass Spectrometry) analysis of the positive electrode active material according to Example 1. The mass analysis result shows that there were many $BO_2$ forms. Referring to this result, the boron-containing compound coated on the surface of the positive electrode active material had $LiBO_2$ as a main component.

Figure 8:
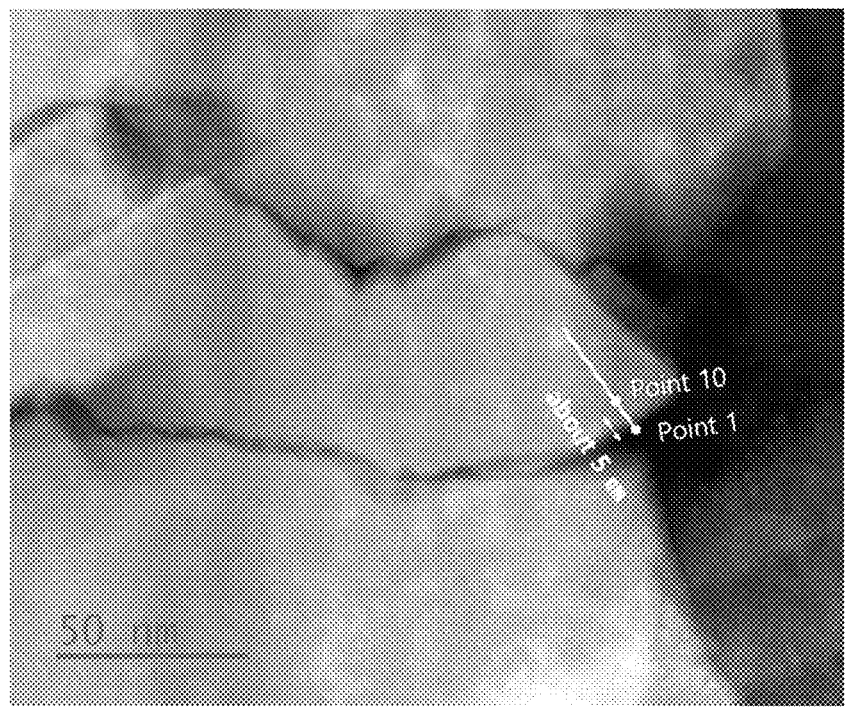
FIG. 8 is a transmission electron microscopy (TEM) image of primary particles exposed to a surface of a secondary particle in a first positive electrode active material according to Example 1.
Figure 9:
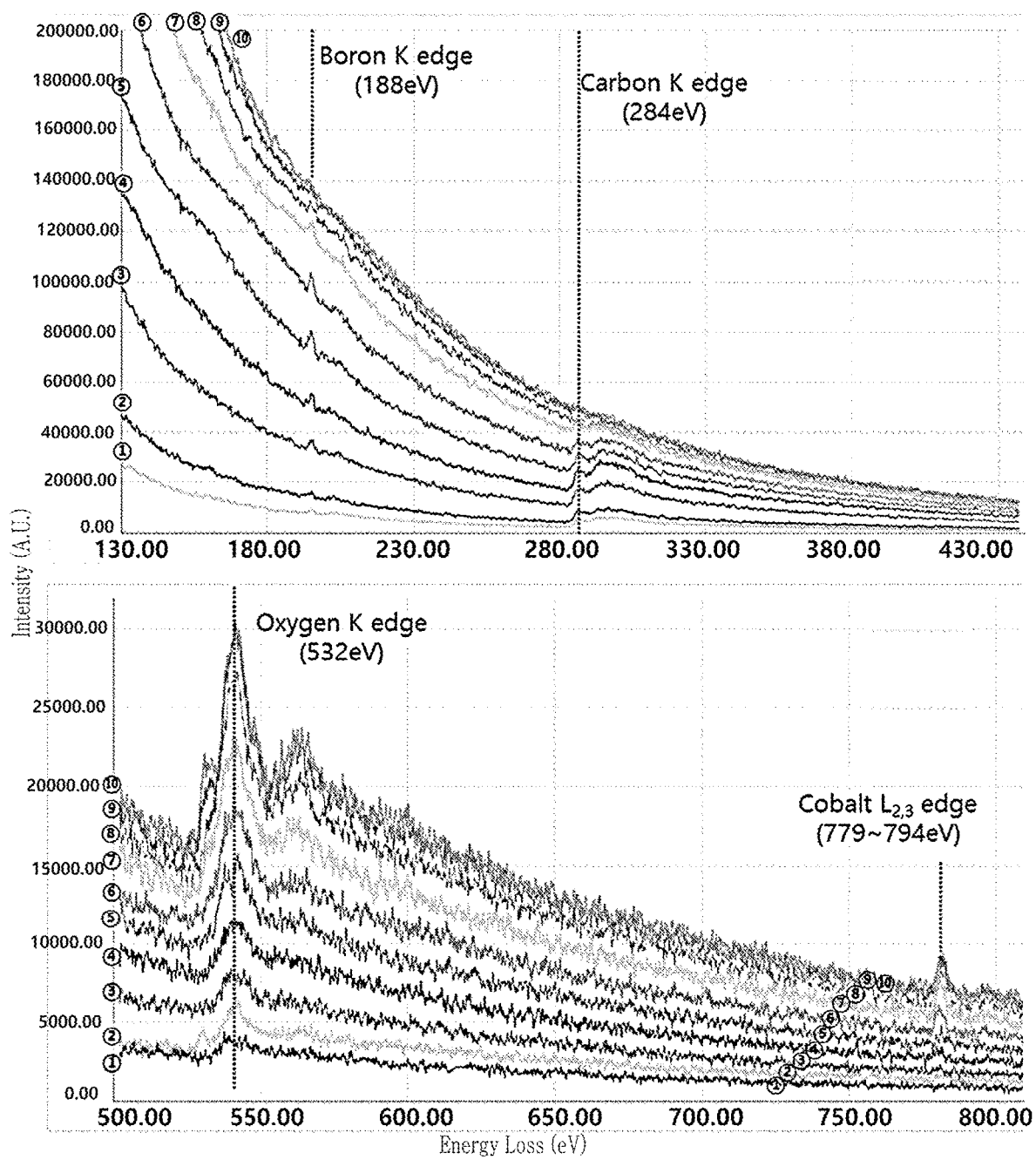
FIG. 9 is a transmission electron microscope-electron energy loss spectroscopy (TEM-EELS) analysis graph for a total of 10 points from point 1 to point 10 shown in FIG. 8, where the horizontal axis is Energy loss in eV, and the vertical axis is Intensity in A.U.

Evaluation Example 3: Confirmation of Boron Doping Layer of First Positive Electrode Active Material FIG. 8 is a TEM image of primary particles exposed on the surface of a secondary particle in the first positive electrode active material of the final positive electrode active material of Example 1, that is, the primary particles on the outermost of the secondary particle. Electron energy loss spectroscopy (EELS) was analyzed at 10 points from point 1 to point 10 which are marked in FIG. 8, and the results are shown in FIG. 9. In FIG. 9, for example, ① indicates an analysis graph at the point 1. Referring to the bottom graph of FIG. 9, because cobalt was detected from the point 4, the surface of the positive electrode active material started from about the point 4. Referring to the top graph of FIG. 9, boron was detected from point 3 to point 8, wherein the point 3 was understood as a boron coating layer on the surface of the positive electrode active material, and because the boron detected from the point 4 to the point 8 was present in the inner portion of the positive electrode active material, the boron doping layer was understood to have a very thin thickness.

Evaluation Example 4: Confirmation of Boron Coating on Surface and Internal Grain Boundaries of First Positive Electrode Active Material In the positive electrode active material of Example 1, the first positive electrode active material and the second positive electrode active material were separately prepared. The separation of the active materials was proceeded by utilizing nitrogen as a transport gas and Turbo Classifier (Nisshin Engineering Inc.). In addition, the first positive electrode active material (first lithium nickel-based composite oxide) in Comparative Example 1 was dry-mixed with 0.125 mol % of boric acid and then, heat-treated at 350° C. for 8 hours, to prepare a positive electrode active material of Reference Example 1. Reference Example 1 is a case of boron-coating an oxide-type or kind secondary particle active material in a conventional coating method.

The three types (kinds) of positive electrode active materials were measured with respect to boron contents by performing an ICP (Inductively Coupled Plasma) emission spectroscopy analysis. Subsequently, 10 g of each positive electrode active material was added to 100 g of distilled water and then, stirred for 30 minutes and filtered with a filter. This washing process all removed all the boron present on the surface of the positive electrode active materials or in a region near the surface. The recovered positive electrode active materials were dried at 130° C. for 24 hours, and ICP emission spectroscopy thereof was analyzed to measure each amount of boron remaining in the positive electrode active materials, which was provided as an amount of boron in the inner portion of the positive electrode active material, that is, at grain boundaries. In addition, the amount of boron after the washing was subtracted from the amount of boron before the washing to obtain an amount of boron removed through the washing, which was provided as an amount of boron on the surface of the positive electrode active material. In Table 2, unit ppm indicates $10^{-4}$ wt %, which refers to a ratio of a boron weight to a total weight of a positive electrode active material.

TABLE 2

| | Boron (ppm) before washing | Boron (ppm) at the internal grain boundary | Boron (ppm) on the surface |
|---|---|---|---|
| First positive electrode active material of Example 1 | 540 | 30 | 510 |
| Second positive electrode active material of Example 1 | 350 | 0 | 350 |
| Reference Example 1 | 540 | 0 | 540 |

Referring to Table 2, the first positive electrode active material of Example 1 was coated with boron at the internal grain boundaries as well as on the surface, wherein a boron coating amount on the surface was about 0.0510 wt % based on 100 wt % of the positive electrode active material, and an boron coating amount at the internal grain boundaries was about 0.003 wt % based on 100 wt % of the positive electrode active material, and a weight ratio thereof was about 94:6. On the other hand, as for the second positive electrode active material having a monolith structure according to Example 1, boron was not coated in the inner portion of the particles. In addition, Reference Example 1, in which the boron coating was performed on the oxide-type or kind secondary particle active material in the conventional method, exhibited that boron was not coated at the internal grain boundaries thereof.

Evaluation Example 5: SEM Photograph Confirmation

Figure 10:
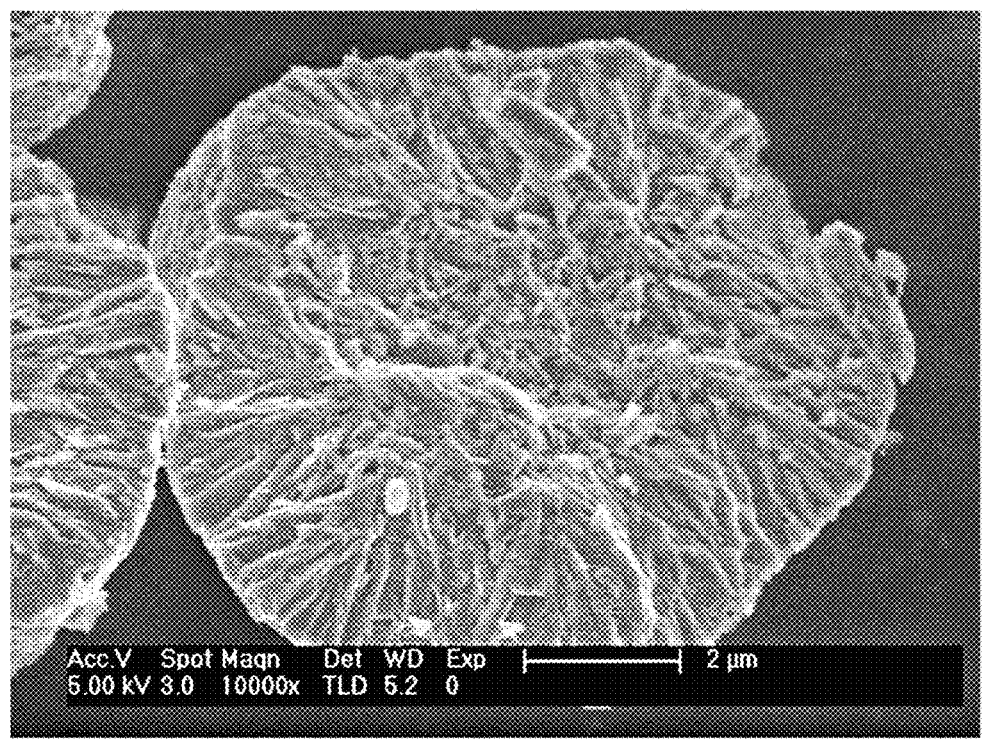
FIG. 10 is a scanning electron microscope (SEM) image of a fracture surface of a first nickel-based composite hydroxide according to Example 1.

FIG. 10. Is an SEM image showing a fracture surface of the first nickel-based composite hydroxide of Example 1, in which there was a region where pores were formed and a surface portion around (e.g., surrounding) the region where the primary particles were oriented toward the surface direction of the secondary particle.

Figure 11:
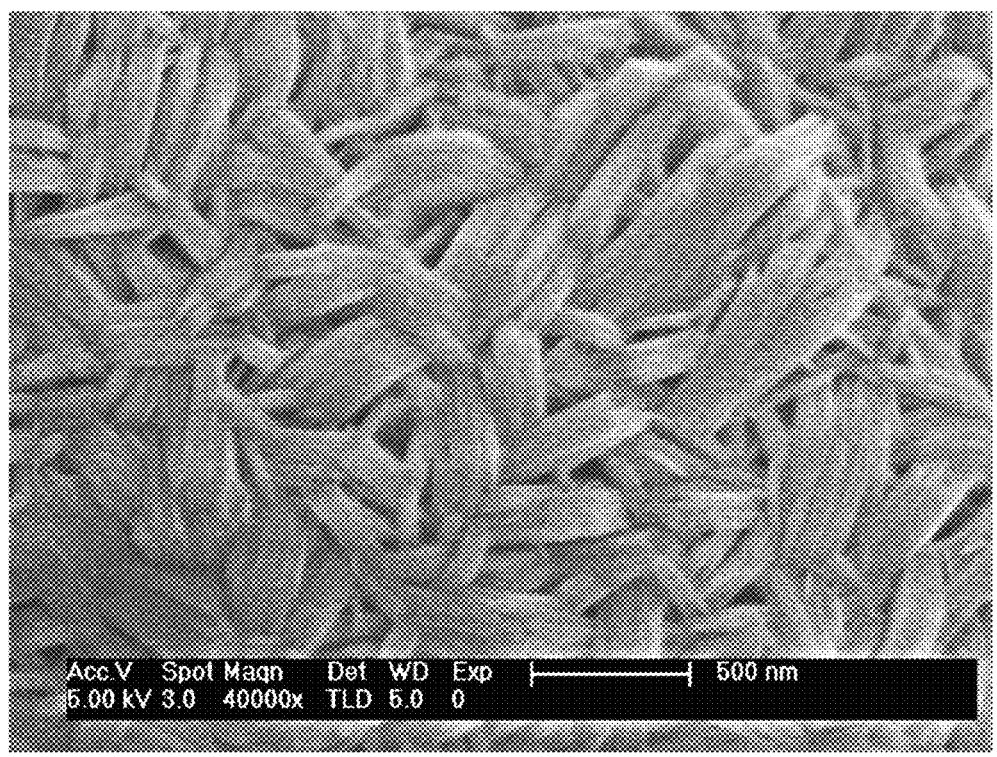
FIG. 11 is an SEM image of a surface of a first nickel-based composite hydroxide according to Example 1.

FIG. 11 is a SEM image showing the surface of the first nickel-based composite hydroxide of Example 1. Pores on the surface shown in FIG. 11 are open-type or kind pores which were formed by a void between sheet-shaped primary particles radially arranged and were deeply connected from the surface of the secondary particle toward the center of the secondary particle.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is also inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While the present disclosure has been described in connection with what is presently considered to be practical example embodiments, it is to be understood that the present disclosure is not limited to the disclosed embodiments. In contrast, it is intended to cover one or more suitable modifications and equivalent arrangements included within the spirit and scope of the appended claims and equivalents thereof.

Reference Numerals:

11: secondary particle
12: inner portion of secondary particle
13: primary particle
14: outer portion of secondary particle
100: rechargeable lithium battery
113: separator
120: battery case
112: negative electrode
114: positive electrode
140: sealing member

What is claimed is:

1. A method of preparing a positive electrode active material for a rechargeable lithium battery, the method comprising the following steps in the sequence set forth:
   first mixing
      a first nickel-based composite hydroxide in a form of a secondary particle in which a plurality of primary particles are aggregated and at least a portion of the primary particles have a radially arranged structure,
      a second lithium nickel-based composite oxide having a monolith structure,
      a lithium raw material, and
      a boron raw material; and then
   performing heat-treatment.

2. The method of claim 1, wherein
the heat-treatment is performed at a temperature of about 650° C. to about 850° C. for about 5 hours to about 25 hours.

3. The method of claim 1, wherein
the secondary particle of the first nickel-based composite hydroxide comprises an inner portion having an irregular porous structure and an outer portion having a radially arranged structure,
the first nickel-based composite hydroxide is represented by Chemical Formula 11, and
the second lithium nickel-based composite oxide is represented by Chemical Formula 1:

$$Ni_{x11}M^{11}{}_{y11}M^{12}{}_{1-x11-y11}(OH)_2 \quad \text{Chemical Formula 11}$$

wherein, in Chemical Formula 11, $0.3 \leq x11 \leq 1$, $0 \leq y11 \leq 0.7$, and $M^{11}$ and $M^{12}$ are each independently at least one element selected from Al, B, Ba, Ca, Ce, Co, Cr, F, Fe, Mg, Mn, Mo, Nb, P, S, Si, Sr, Ti, V, W, and Zr, and $$Li_{a1}Ni_{x1}M^1{}_{y1}M^2{}_{1-x1-y1}O_{2-z}X_z \quad \text{Chemical Formula 1}$$

wherein, in Chemical Formula 1, $0.9 \leq a1 \leq 1.8$, $0.3 \leq x1 \leq 1$, $0 \leq y1 \leq 0.7$, and $0 \leq z \leq 0.1$, $M^1$ and $M^2$ are each independently at least one element selected from Al, B, Ba, Ca, Ce, Co, Cr, Fe, Mg, Mn, Mo, Nb, Si, Sr, Ti, V, W, and Zr, and X is at least one element selected from F, P, and S.

4. The method of claim 1, wherein
the second lithium nickel-based composite oxide is obtained by mixing a second nickel-based composite hydroxide represented by Chemical Formula 11 and a lithium raw material, performing heat-treatment at a temperature of about 800° C. to about 1100° C. for about 1 hour to about 25 hours, and performing pulverization:

$$Ni_{x11}M^{11}{}_{y11}M^{12}{}_{1-x11-y11}(OH)_2 \quad \text{Chemical Formula 11}$$

wherein, in Chemical Formula 11, $0.3 \leq x11 \leq 1$, $0 \leq y11 \leq 0.7$, and $M^{11}$ and $M^{12}$ are each independently at least one element selected from Al, B, Ba, Ca, Ce, Co, Cr, F, Fe, Mg, Mn, Mo, Nb, P, S, Si, Sr, Ti, V, W, and Zr.

5. The method of claim 1, wherein
an average particle diameter (D50) of the secondary particle of the first nickel-based composite hydroxide is about 5 μm to about 25 μm,
an average particle diameter (D50) of the monolith structure of the second lithium nickel-based composite oxide is about 0.05 μm to about 8 μm, and
a mixing ratio of the first nickel-based composite hydroxide and the second lithium nickel-based composite oxide is a weight ratio of about 5:5 to about 9:1.

6. The method of claim 1, wherein
the lithium raw material comprises $Li_2CO_3$, LiOH, LiF, a hydrate thereof, or a combination thereof, and is mixed in an amount of about 0.9 parts by mole to about 1.1 parts by mole based on 1 part by mole of the total amount of elements excluding oxygen and hydrogen in the first nickel-based composite hydroxide.

7. The method of claim 1, wherein
the boron raw material comprises $H_3BO_3$, $HBO_2$, $B_2O_3$, $C_6H_5B(OH)_2$, $(C_6H_5O)_3B$, $[CH_3(CH_2)_3O]_3B$, $C_{13}H_{19}BO_3$, $C_3H_9B_3O_6$, $(C_3H_7O)_3B$, or a combination thereof, and
an amount of the boron raw material is about 0.01 parts by mole to about 0.5 parts by mole based on 100 parts by mole of the total amount of elements excluding lithium, oxygen, and hydrogen in the first nickel-based composite hydroxide and the second lithium nickel-based composite oxide.

8. The method of claim 1, wherein
the heat-treatment comprises a temperature-raising process and a temperature-maintaining process,
wherein a temperature-raising time of the temperature-raising process is longer than a temperature-maintaining time of the temperature-maintaining process, or
wherein a ratio of (the temperature-raising time):(the temperature-maintaining time) is about 1.1:1 to about 10:1, or
wherein the temperature-raising time is about 6 hours to about 16 hours, and the temperature-maintaining time is about 1 hour to about 9 hours.

9. A positive electrode active material for a rechargeable lithium battery, the positive electrode active material comprising
a first positive electrode active material comprising a first lithium nickel-based composite oxide and being in a form of a secondary particle in which a plurality of primary particles are aggregated and at least a portion of the primary particles have a radially arranged structure, and
a second positive electrode active material comprising a second lithium nickel-based composite oxide having a monolith structure,
wherein the first positive electrode active material and the second positive electrode active material are coated with a boron-containing compound, and
the first positive electrode active material comprises a boron coating layer on a surface of the secondary particle and a boron doping layer inside the primary particles exposed on the surface of the secondary particle.

10. The positive electrode active material of claim 9, wherein
the boron-containing compound comprises boron oxide, lithium borate, or a combination thereof.

11. The positive electrode active material of claim 9, wherein
the boron-containing compound is $B_2O^2$, $B_2O_3$, $B_4O_3$, $B_4O_5$, $LiBO_2$, $Li_3B_7O_{12}$, $Li_6B_4O_9$, $Li_3B_{11}O_{18}$, $Li_2B_4O_7$, $Li_3BO_3$, or a combination thereof, and
an amount of boron based on the total amount of elements other than lithium and oxygen in the entire positive electrode active material is about 0.01 wt % to about 0.5 wt %.

12. The positive electrode active material of claim 9, wherein
in the first positive electrode active material, the boron doping layer is within a depth range of about 10 nm from an outer surface of the primary particle exposed to the surface of the secondary particle.

13. The positive electrode active material of claim 9, wherein
the first positive electrode active material further comprises a grain boundary boron coating portion on surfaces of the primary particles in an inner portion of the secondary particle, and
in the first positive electrode active material, a weight of boron in the boron coating layer on the surface of the secondary particle is greater than a weight of boron in the grain boundary boron coating portion.

14. The positive electrode active material of claim 13, wherein
in the first positive electrode active material, a weight of boron in the boron coating layer on the surface of the secondary particle is about 4 times or more of a weight of boron in the grain boundary boron coating portion, or
in the first positive electrode active material, a ratio of a weight of boron in the boron coating layer on the surface of the secondary particle to a weight of boron in the grain boundary boron coating portion is about 70:30 to about 98:2.

15. The positive electrode active material of claim 13, wherein
an amount of boron in the boron coating layer on the surface of the secondary particle is about 0.02 wt % to about 0.5 wt % and an amount boron in the grain boundary boron coating portion is about 0.001 wt % to about 0.05 wt %, based on 100 wt % of the first positive electrode active material.

16. The positive electrode active material of claim 9, wherein
in the first positive electrode active material, at least a portion of the primary particles comprises plate-shaped primary particles,
an average length of the plate-shaped primary particles is about 150 nm to about 500 nm, an average thickness of the plate-shaped primary particles is about 100 nm to about 200 nm, and a ratio of the average thickness to the average length is about 1:2 to about 1:5, and
the secondary particle comprises open pores on the surface of the secondary particle, and the open pores are formed by a space between the radially arranged plate-shaped primary particles and are pores connected in a central direction from the surface of the secondary particle.

17. The positive electrode active material of claim 9, wherein
in the first positive electrode active material, the secondary particle comprises an inner portion having an irregular porous structure and an outer portion having a radially arranged structure.

18. The positive electrode active material of claim 9, wherein the first lithium nickel-based composite oxide and the second lithium nickel-based composite oxide are the same as or different from each other in term of chemical composition, and are each independently represented by Chemical Formula 1:

$$Li_{a1} Ni_{x1} M^1{}_{y1} M^2{}_{1-x1-y1} O_{2-z} X_z \qquad \text{Chemical Formula 1}$$

wherein, in Chemical Formula 1, $0.9 \leq a1 \leq 1.8$, $0.3 \leq x1 \leq 1$, $0 \leq y1 \leq 0.7$, and $0 \leq z \leq 0.1$, $M^1$ and $M^2$ are each independently at least one element selected from Al, B, Ba, Ca, Ce, Co, Cr, Fe, Mg, Mn, Mo, Nb, Si, Sr, Ti, V, W, and Zr, and X is at least one element selected from F, P, and S.

19. The positive electrode active material of claim 9, wherein an average particle diameter (D50) of the secondary particle of the first positive electrode active material is about 5 μm to about 25 μm, an average particle diameter (D50) of the monolith structure of the second positive electrode active material is about 0.05 μm to about 8 μm, and the positive electrode active material comprises about 50 wt % to about 90 wt % of the first positive electrode active material, and about 10 wt % to about 50 wt % of the second positive electrode active material, based on 100 wt % of the positive electrode active material.

20. A rechargeable lithium battery, comprising a positive electrode comprising the positive electrode active material of claim 14;

a negative electrode;

a separator between the positive electrode and the negative electrode; and an electrolyte.

* * * * *